(12) United States Patent
Frank

(10) Patent No.: US 8,466,426 B2
(45) Date of Patent: Jun. 18, 2013

(54) FABRICATION OF A HIGH PERFORMANCE NEUTRON DETECTOR WITH NEAR ZERO GAMMA CROSS TALK

(75) Inventor: David L. Frank, Highland Beach, FL (US)

(73) Assignee: Innovative American Technology Inc., Coconut Creek, FL (US)

(*) Notice: Subject to any disclaimer, the term of this patent is extended or adjusted under 35 U.S.C. 154(b) by 0 days.

(21) Appl. No.: 13/590,499

(22) Filed: Aug. 21, 2012

(65) Prior Publication Data

US 2012/0317791 A1 Dec. 20, 2012

Related U.S. Application Data

(63) Continuation of application No. 12/713,101, filed on Feb. 25, 2010, now Pat. No. 8,247,781, and a continuation-in-part of application No. 12/483,066, filed on Jun. 11, 2009, and a continuation-in-part of application No. 11/624,089, filed on Jan. 17, 2007, (Continued)

(51) Int. Cl.
*G01T 3/06* (2006.01)

(52) U.S. Cl.
USPC .................................. 250/390.11

(58) Field of Classification Search
USPC .................................... 250/390.11
See application file for complete search history.

(56) References Cited

U.S. PATENT DOCUMENTS

| 3,858,728 A | 1/1975 | Fathauer |
| 3,872,287 A | 3/1975 | Koeman |

(Continued)

FOREIGN PATENT DOCUMENTS

| JP | 55050178 A | 4/1980 |
| JP | 58223775 A | 12/1983 |

(Continued)

OTHER PUBLICATIONS

U.S. Appl. No. 11/291,574, filed Dec. 2005, Frank.

(Continued)

*Primary Examiner* — David Porta
*Assistant Examiner* — Hugh H Maupin
(74) *Attorney, Agent, or Firm* — Fleit Gibbons Gutman Bongini & Bianco PL; Jose Gutman

(57) ABSTRACT

A fabrication method is provided for making a high efficiency neutron detector using a scintillator medium coupled with fiber optic light guides. The light guides provide light pulses to photo sensor and thereby to high speed analog to digital conversion and digital electronics that perform digital pulse shape discrimination for near zero gamma cross talk.

17 Claims, 18 Drawing Sheets

Related U.S. Application Data

(63) now Pat. No. 7,269,527, and a continuation-in-part of application No. 11/852,835, filed on Sep. 10, 2007, now Pat. No. 7,668,681, said application No. 12/713,101 is a continuation-in-part of application No. 11/564,193, filed on Nov. 28, 2006, now Pat. No. 7,851,766, which is a continuation-in-part of application No. 11/291,574, filed on Dec. 1, 2005, now Pat. No. 7,592,601.

(60) Provisional application No. 61/208,492, filed on Feb. 25, 2009, provisional application No. 61/209,194, filed on Mar. 4, 2009, provisional application No. 61/210,075, filed on Mar. 13, 2009, provisional application No. 61/210,122, filed on Mar. 13, 2009, provisional application No. 61/210,234, filed on Mar. 16, 2009, provisional application No. 61/210,238, filed on Mar. 16, 2009, provisional application No. 61/211,629, filed on Apr. 1, 2009, provisional application No. 61/219,111, filed on Jun. 22, 2009, provisional application No. 61/231,805, filed on Aug. 6, 2009, provisional application No. 61/238,819, filed on Sep. 1, 2009, provisional application No. 61/246,299, filed on Sep. 28, 2009, provisional application No. 61/249,408, filed on Oct. 7, 2009, provisional application No. 61/257,964, filed on Nov. 4, 2009, provisional application No. 61/257,968, filed on Nov. 4, 2009, provisional application No. 61/289,163, filed on Dec. 22, 2009, provisional application No. 61/293,974, filed on Jan. 11, 2010, provisional application No. 61/293,993, filed on Jan. 11, 2010, provisional application No. 61/131,639, filed on Jun. 11, 2008.

(56) References Cited

U.S. PATENT DOCUMENTS

| | | |
|---|---|---|
| 3,936,645 A | 2/1976 | Iversen |
| 4,029,976 A | 6/1977 | Fish et al. |
| 4,158,773 A | 6/1979 | Novak |
| 4,535,246 A | 8/1985 | Shani |
| 4,799,828 A | 1/1989 | Georgii |
| 5,056,958 A | 10/1991 | Campbell |
| 5,171,986 A | 12/1992 | Loomis et al. |
| 5,241,573 A | 8/1993 | Thacker |
| 5,298,756 A | 3/1994 | McCollum et al. |
| 5,308,986 A | 5/1994 | Walker |
| 5,347,129 A | 9/1994 | Miller et al. |
| 5,434,415 A | 7/1995 | Terada et al. |
| 5,471,987 A | 12/1995 | Nakazawa et al. |
| 5,633,508 A | 5/1997 | Schleppenbach |
| 5,638,420 A | 6/1997 | Armistead |
| 5,665,970 A | 9/1997 | Kronenberg et al. |
| 5,703,490 A | 12/1997 | Kennedy |
| 5,838,759 A | 11/1998 | Armistead |
| 5,866,907 A | 2/1999 | Drukier et al. |
| 6,011,266 A | 1/2000 | Bell |
| 6,118,850 A | 9/2000 | Mayo et al. |
| 6,370,222 B1 | 4/2002 | Cornick |
| 6,407,390 B1 | 6/2002 | Rozsa |
| 6,433,335 B1 | 8/2002 | Kronenberg et al. |
| 6,479,826 B1 | 11/2002 | Klann et al. |
| 6,515,285 B1 | 2/2003 | Marshall et al. |
| 6,545,281 B1 | 4/2003 | McGregor et al. |
| 6,791,089 B1 | 9/2004 | Caffrey et al. |
| 6,845,873 B1 | 1/2005 | Chattey |
| 6,891,470 B2 | 5/2005 | Bohinc |
| 6,897,789 B2 | 5/2005 | Lim |
| 6,937,692 B2 | 8/2005 | Johnson |
| 6,952,652 B2 | 10/2005 | Butters |
| 6,980,483 B2 | 12/2005 | McDonald |
| 6,998,617 B2 | 2/2006 | D'Emilio et al. |
| 7,002,143 B2 | 2/2006 | Parker et al. |
| 7,005,982 B1 | 2/2006 | Frank |
| 7,026,944 B2 | 4/2006 | Alioto et al. |
| 7,030,755 B2 | 4/2006 | Bohinc |
| 7,064,336 B2 | 6/2006 | Archer et al. |
| 7,115,875 B1 | 10/2006 | Worstell |
| 7,116,235 B2 | 10/2006 | Alioto et al. |
| 7,142,109 B1 | 11/2006 | Frank |
| 7,151,447 B1 | 12/2006 | Willms et al. |
| 7,164,138 B2 | 1/2007 | McGregor et al. |
| 7,183,554 B2 | 2/2007 | Gallagher et al. |
| 7,269,527 B1 | 9/2007 | Frank |
| 7,319,717 B2 | 1/2008 | Zitting |
| 7,324,921 B2 | 1/2008 | Sugahara |
| 7,356,115 B2 | 4/2008 | Ford et al. |
| 7,383,142 B2 | 6/2008 | Scoullar et al. |
| 7,391,028 B1 | 6/2008 | Rubenstein |
| 7,411,198 B1 | 8/2008 | Holland et al. |
| 7,414,526 B2 | 8/2008 | Zitting et al. |
| 7,423,273 B2 | 9/2008 | Clayton et al. |
| 7,465,924 B1 | 12/2008 | Klann et al. |
| 7,496,483 B2 | 2/2009 | Pellegrino et al. |
| 7,525,101 B2 | 4/2009 | Grodzins |
| 7,550,738 B1 | 6/2009 | DeVito |
| 7,592,601 B2 | 9/2009 | Frank |
| 7,609,158 B2 | 10/2009 | Banting et al. |
| 7,677,857 B2 | 3/2010 | Takehara et al. |
| 7,759,649 B2 | 7/2010 | Frank |
| 7,800,439 B2 | 9/2010 | Riedel et al. |
| 7,851,766 B2 | 12/2010 | Frank |
| 7,893,557 B2 | 2/2011 | Davis et al. |
| 8,080,807 B2 | 12/2011 | McCormick et al. |
| 2002/0175291 A1 | 11/2002 | Reeder et al. |
| 2003/0108150 A1 | 6/2003 | Franke |
| 2003/0144800 A1 | 7/2003 | Davis et al. |
| 2003/0165211 A1 | 9/2003 | Godzins et al. |
| 2003/0201394 A1 | 10/2003 | Peoples |
| 2004/0018060 A1 | 1/2004 | Knezek et al. |
| 2004/0036025 A1 | 2/2004 | Wong et al. |
| 2004/0119591 A1 | 6/2004 | Peeters |
| 2004/0126895 A1 | 7/2004 | Overbeck et al. |
| 2004/0148137 A1 | 7/2004 | Zerwekh et al. |
| 2004/0180369 A1 | 9/2004 | Franzen et al. |
| 2005/0001728 A1 | 1/2005 | Appelt et al. |
| 2005/0011849 A1 | 1/2005 | Chattey |
| 2005/0023477 A1 | 2/2005 | Archer et al. |
| 2005/0045827 A1 | 3/2005 | Katagiri et al. |
| 2005/0060112 A1 | 3/2005 | Schafer et al. |
| 2005/0082485 A1 | 4/2005 | Torii |
| 2005/0127300 A1 | 6/2005 | Bordynuik |
| 2005/0135535 A1 | 6/2005 | Wallace |
| 2005/0156734 A1 | 7/2005 | Zerwekh et al. |
| 2005/0205793 A1 | 9/2005 | Bohinc |
| 2005/0220247 A1 | 10/2005 | Ruddy et al. |
| 2005/0224719 A1 | 10/2005 | Polichar et al. |
| 2005/0258372 A1 | 11/2005 | McGregor et al. |
| 2005/0275545 A1 | 12/2005 | Alioto et al. |
| 2006/0097171 A1 | 5/2006 | Balchunas et al. |
| 2006/0138331 A1 | 6/2006 | Guillebaud et al. |
| 2006/0141615 A1 | 6/2006 | Lu |
| 2006/0157655 A1 | 7/2006 | Mammone et al. |
| 2006/0284094 A1 | 12/2006 | Inbar |
| 2007/0001123 A1 | 1/2007 | Andrews et al. |
| 2007/0290136 A1 | 12/2007 | Ivan |
| 2008/0023631 A1 | 1/2008 | Majors et al. |
| 2008/0135772 A1 | 6/2008 | Claus et al. |
| 2008/0159416 A1 | 7/2008 | Melick et al. |
| 2009/0014662 A1 | 1/2009 | Suhami |
| 2009/0102680 A1 | 4/2009 | Roos |
| 2010/0123085 A1 | 5/2010 | Feller et al. |
| 2010/0226580 A1 | 9/2010 | Frank |

FOREIGN PATENT DOCUMENTS

| | | |
|---|---|---|
| JP | 1144768 A | 2/1999 |
| JP | 2008111677 A | 5/2008 |
| KR | 10-1992-7004134 | 12/1992 |
| KR | 200191370 Y1 | 8/2000 |
| KR | 10-1005-0067392 | 7/2005 |

| WO | WO98-00681 | 1/1998 |
| WO | 2004043740 A2 | 5/2004 |
| WO | WO2006-085999 | 8/2006 |
| WO | 2007065004 A2 | 6/2007 |
| WO | 2008118219 A2 | 10/2008 |

OTHER PUBLICATIONS

U.S. Appl. No. 11/363,594, filed Feb. 2006, Frank.
U.S. Appl. No. 11/564,193, filed Nov. 2006, Frank.
U.S. Appl. No. 11/931,370, filed Oct. 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. App. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.
Mc Gregor, Douglas S., et al, Bulk GaAs-Based Neutron Detectors for Spent Fuel Analysis, Proceedings of ICONE 8, ICONE—8827, 8th Int'l Conf. on Nuclear Engineering, Apr. 2-6, 2000, pp. 1-8, Baltimore, MD.
Klann, Raymond T., et al. Development of Coated Gallium Arsenide Neutron Detectors, Proceedings of ICONE 8, ICONE—8110, 8th Int'l Conf. on Nuclear Engineering, Apr. 2-6, 2000, pp. 1-6, Baltimore, MD.
Mc Gregor, Douglas S., et al., Designs for Thin-Film-Coated Semiconductor Thermal Neutron Detectors, Nov. 14, 2001, pp. 1-5.
Mc Gregor, Douglas S., et al., New Surface Morphology for Low Stress Thin-Film-Coated Thermal Neutron Detectors, IEEE Transactions on Nuclear Science, vol. 49, No. 4, Aug. 2002, pp. 1999-2004.
Mc Gregor, Douglas S., et al., Design considerations for thin film coated semiconductor thermal neutron detectors—I: basics regarding alpha particle emitting neutron reactive films; Nuclear Instruments and Methods in Physics Research A 500 (2003) pp. 272-308.
Shultis, J. Kenneth, et al., Efficiencies of Coated and Perforated Semiconductor Neutron Detectors, IEEE Transactions on Nuclear Science, vol. 53, No. 3, pp. 1659-1665, Jun. 2006.

Mc Neil, W.J., et al., Perforated Diode Fabrication for Neutron Detection, 2006 IEEE Nuclear Science Symposium Conference Record, pp. 3732-3735, Nov. 17, 2006.
Mc Gregor, D.S., et al., Perforated Semiconductor Neutron Detector Modules, 32nd Annual GOMAC Tech Conference, Mar. 19-22, 2007.
Mc Gregor, Douglas S., et al., Perforated Semiconductor Neutron Detector Modules for Detection of Spontaneous Fission Neutrons, IEEE Conference on Technologies for Homeland Security, May 16-17, 2007.
Shultis, Kenneth J. et al., Designs for Micro-Structured Semiconductor Neutron Detectors, Invited Paper, Proc. SPIE 7079, 70790-6 (2008) pp. 6-1: 6-15.
Mc Gregor, D.S., et al., Micro-Structured High-Efficiency Semiconductor Neutron Detectors, 2008 IEEE Nuclear Science Symposium Conference Record, , pp. 446-448, Nov. 12, 2008.
Ugorowski, P., et al., Characterization of the High-Efficiency Neutron Detector Array (HENDA), 2008 IEEE Nuclear Science Symposium Conference Record, pp. 1901-1903.
Unruh, Troy C., et al., Design and operation of a 2-D thin-film semiconductor neutron detector array for use as a beamport monitor, Nuclear Instruments and Methods in Physics Research A 604 (2009) 150-153.
Mc Neil, Walter J., et al., 1-D array of perforated diode neutron detectors, Nuclear Instruments and Methods in Physics Research A 604 (2009) 127-129.
Bellinger, S.L., et al., Characteristics of 3D Micro-Structured Semiconductor High Efficiency Neutron Detectors, IEEE Transactions on Nuclear Science, vol. 56, No. 3, Jun. 2009, pp. 742-746.
Harrison, Mark J., et al., Improved Techniques for the Fabrication of Frisch Collar CdZnTe Gamma Ray Spectrometers, IEEE Transactions on Nuclear Science, vol. 56, No. 3, Jun. 2009, pp. 1671-1676.
Mc Gregor, D.S., et al., Microstructured semiconductor neutron detectors, Nuclear Instruments and Methods in Physics Research A 608 (2009) 125-131.
International Search Report and Written Opinion, PCT/US2009/047084, Jun. 11, 2009.
International Search Report and Written Opinion of the International Searching Authority for PCT/US2010/025429 dated Sep. 28, 2010.
International Search Report and Written Opinion of the International Searching Authority for PCT/US2010/025432 mailed Sep. 28, 2010.
International Preliminary Report & Written Opinion for PCT/US2010/025429, dated Aug. 30, 2011.
International Search Report and Written Opinion of the International Searching Authority for PCT/US2010/025435 mailed Nov. 30, 2010.
Arni Heller: Smart Buoys Help Protect Submarine Base; Jan. Feb. 2004; Lawrence Livermore National Laboratory; pp. 19-22.
Non-Final Office Action for U.S. Appl. No. 12/840,102, mailed Aug. 17, 2011.
Non-Final Office Action for U.S. Appl. No. 12/409,733, mailed Sep. 2, 2011.
Notice of Allowance for U.S. Appl. No. 12/472,707, mailed Sep. 30, 2011.
Non-Final Office Action received for U.S. Appl. No. 12/712,975 dated Feb. 6, 2013.
Le Gall et al., "Photothermal beam deflection experiment applied to the measurement of directional optical properties of materials", Le Journal de Physique IV, vol. 4, No. C7, Jul. 1, 1994, pp. C7-651, Grenoble, France.
Lavrik et al., "Cantilever transducers as a platform for chemical and biological sensors", Review of Scientific Instruments, AIP, vol. 75, No. 1, Jul. 1, 2004, pp. 2229-2253, Melville, NY.
Extended European Search Report received for European patent application No. 08713592.7 dated Dec. 6, 2012.
Speller, R., "Radiation Based Security", 2001, Radiation Physics and Chemistry, vol. 61, pp. 293-300.
Non-Final Office Action dated Mar. 22, 2012 received for U.S. Appl. No. 12/468,382.
Non-Final Office Action dated Jun. 8, 2012 received for U.S. Appl. No. 11/928,299.
Non-Final Office Action dated Jun. 21, 2012 received for U.S. Appl. No. 12/501,220.

Non-Final Office Action dated Jul. 5, 2012 received for U.S. Appl. No. 12/698,598.

Non-Final Office Action dated Mar. 9, 2012 received for U.S. Appl. No. 12/409,758.

Non-Final Office Action dated Aug. 7, 2012 received for U.S. Appl. No. 11/624,121.

Tian et al., "Comparison of statistical pattern-recognition algorithms for hybrid processing. I. Linear-mapping algorithms", J. Opt. Soc. Am. A, vol. 5, No. 10, pp. 1655-1669, Oct. 1988.

Jastaniah et al., "Digital pulse shape algorithms for scintillation-based neutron detectors," 2001, IEEE Nuclear Science Symposium Conference Record, vol. 2, Nov. 2001, pp. 816-821.

Intersil Corporation EL2030 Data sheet, www.intersil.com, 2003, 12 pages.

Non-Final Office Action dated Mar. 9, 2012 received for U.S. Appl. No. 12/483,066.

Final Office Action dated Aug. 30, 2012 received for U.S. Appl. No. 12/483,066.

Non-Final Office Action dated Oct. 23, 2012 received for U.S. Appl. No. 12/712,991.

Non-Final Office Action dated Sep. 10, 2012 received for U.S. Appl. No. 12/713,014.

Non-Final Office Action dated Oct. 10, 2012 received for U.S. Appl. No. 12/712,975.

CSP application notes, retrieved from http://cremat.com/CSP_app_notes.htm; cited in 2006 publication.

Cremat, Inc. CR-110 charge sensitive preamplifier: application guide Rev. 2, Dec. 2006.

FABRICATION OF A HIGH PERFORMANCE NEUTRON DETECTOR WITH NEAR ZERO GAMMA CROSS TALK

CROSS-REFERENCE TO RELATED APPLICATIONS

This application is a Continuation of application Ser. No. 12/713,101 filed on Feb. 25, 2010, now U.S. Pat. No. 8,247,781. Application Ser. No. 12/713,101 claims priority from prior provisional application 61/208,492 filed on Feb. 25, 2009. Application Ser. No. 12/713,101 claims priority from prior provisional application 61/209,194 filed on Mar. 4, 2009. Application Ser. No. 12/713,101 claims priority from prior provisional application 61/210,075 filed on Mar. 13, 2009. Application Ser. No. 12/713,101 claims priority from prior provisional application 61/210,122 filed on Mar. 13, 2009. Application Ser. No. 12/713,101 claims priority from prior provisional application 61/210,234 filed on Mar. 16, 2009. Application Ser. No. 12/713,101 claims priority from prior provisional application 61/210,238 filed on Mar. 16, 2009. Application Ser. No. 12/713,101 claims priority from prior provisional application 61/211,629 filed on Apr. 1, 2009. Application Ser. No. 12/713,101 claims priority from prior provisional application 61/219,111 filed on Jun. 22, 2009. Application Ser. No. 12/713,101 claims priority from prior provisional application 61/231,805 filed on Aug. 6, 2009. Application Ser. No. 12/713,101 claims priority from prior provisional application 61/238,819 filed on Sep. 1, 2009. Application Ser. No. 12/713,101 claims priority from prior provisional application 61/246,299 filed on Sep. 28, 2009. Application Ser. No. 12/713,101 claims priority from prior provisional application 61/249,408 filed on Oct. 7, 2009. Application Ser. No. 12/713,101 claims priority from prior provisional application 61/257,964 filed on Nov. 4, 2009. Application Ser. No. 12/713,101 claims priority from prior provisional application 61/257,968 filed on Nov. 4, 2009. Application Ser. No. 12/713,101 claims priority from prior provisional application 61/289,163 filed on Dec. 22, 2009. Application Ser. No. 12/713,101 claims priority from prior provisional application 61/293,974 filed on Jan. 11, 2010. Application Ser. No. 12/713,101 claims priority from prior provisional application 61/293,993 filed on Jan. 11, 2010. Application Ser. No. 12/713,101 is a Continuation-in-part of application Ser. No. 12/483,066 filed on Jun. 11, 2009 and application Ser. No. 12/483,066 which claims priority from prior provisional application 61/131,639 filed on Jun. 11, 2008 and application Ser. No. 12/483,066 which is a continuation-in-part of application Ser. No. 11/624,089 filed on Jan. 17, 2007 and application Ser. No. 12/483,066 which is a continuation-in-part of application Ser. No. 11/852,835 filed on Sep. 10, 2007. Application Ser. No. 12/713,101 is continuation-in-part of application Ser. No. 11/564,193 filed on Nov. 28, 2006 and application No. 11/564,193 which is continuation-in-part of application Ser. No. 11/291,574 filed on Dec. 1, 2005. The entire collective teachings thereof being herein incorporated by reference.

FIELD OF THE INVENTION

The present invention generally relates to the field of gamma and neutron detection systems, and more particularly relates to high neutron detection efficiency with low gamma cross talk and fabrication methods for neutron and gamma detectors.

BACKGROUND OF THE INVENTION

The accepted standard in neutron detection has been based on helium-3 (He3). One problem with conventional neutron detectors based on helium-3 is that helium-3 is a natural resource with a very limited supply. These types of detectors and all other known neutron detectors have a gamma rejection of approximately up to 4 gamma pulses in 10,000 pulses detected. Unfortunately, these levels of gamma rejection in conventional neutron detectors can result in too many false positive alarms, indicating that a neutron particle has been detected when in reality a gamma particle was detected. Gamma particles can occur from natural phenomena, such as from the sun, while neutron particles typically indicate a presence of radioactive and/or fissile material. Accurate detection of the occurrence of the neutron particles, without false detection of gamma particles as neutron particles, is critical for monitoring border activities such as during homeland defense and security.

The need for an efficient neutron detector, with little to no false positive alarms due to gamma cross-talk, is critical in many applications such as for homeland security, medical applications, and military applications. There is also a great need for neutron detectors that are not based on helium-3 due to the limited resources of helium.

There are technologies that enable neutron detection without the use of helium-3. For example, some technologies use lithium-6 dissolved uniformly into a plastic or glass scintillator. While these approaches have advantages, they are difficult to produce in volume with consistent performance characteristics and have difficulty based on light leaks into the detector area. These devices produce much less light per event and require much more gain in the photomultiplier tube (PMT). These types of devices also have increased gamma ray sensitivity and use analog techniques to separate gamma from neutron events which typically result in gamma pulse rejection rates of 4 in ten thousand, leaving an unsatisfactory rate of gamma false positives (gamma cross-talk).

There is also a need for a reliable and efficient production method to produce neutron detectors in volume.

SUMMARY OF THE INVENTION

Various embodiments according to the present invention disclose methods for the efficient fabrication for a high efficiency neutron detector with consistent performance and that are durable and that are not susceptible to light leaks into the detector area. These high performance neutron detectors are designed with near zero gamma interference. They use a scintillator medium coupled with fiber optic light guides operating at high signal speeds.

In one embodiment, the detector is designed with a bundle of fiber optic light guide media having one narrowed end optically coupled to an optical signal input of a photosensor, and with a reflective, or a non-reflective light absorptive material, terminating an opposing end of the fiber optic light guide media.

In another embodiment, the moderator material can be designed to enable the thermal neutron detector to detect fast neutrons thermalized to a specific energy range. Multiple layers of moderator and thermal neutron detectors can be arranged to detect different stages of thermalized neutrons providing energy information on the neutrons detected at each layer.

According to one embodiment, staggered multiple layers of optical fiber strands and detector materials can be sandwiched together, where a first set of parallel fiber strands in a first fiber layer are disposed on top of detector material layer and which is disposed on top of a second set of parallel fiber strands in a second fiber layer. The first set of parallel fiber strands is arranged in a staggered orientation relative to the second set of parallel fiber strands. By staggering the two sets of parallel fiber layers by a portion of the diameter of a fiber (such as by one half of the diameter of a fiber), it locates the sandwiched parallel fibers closer together (with the detector material in between) thereby more likely to couple light photons into the fibers when neutrons interact with the detection materials.

In another embodiment, one or more neutron detectors are spatially distributed between moderator material. Optionally, scintillator material in a neutron detector can comprise a plurality of scintillation layers that are spatially distributed interposed between moderator material.

Various embodiments of the present invention can be fabricated using rapid curing processes for polymers such as using microwave curing. Such fast curing using, for example, microwave curing can create a high performance neutron detector with high reliability of homogenous distribution of the particles encapsulated in a polymer to produce a high performance neutron detector. Examples of microwave curing include Variable Frequency Microwave (VFM) technique or High-Frequency Microwave Beams (HFMB).

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Neutron Detector System

Figure 1:
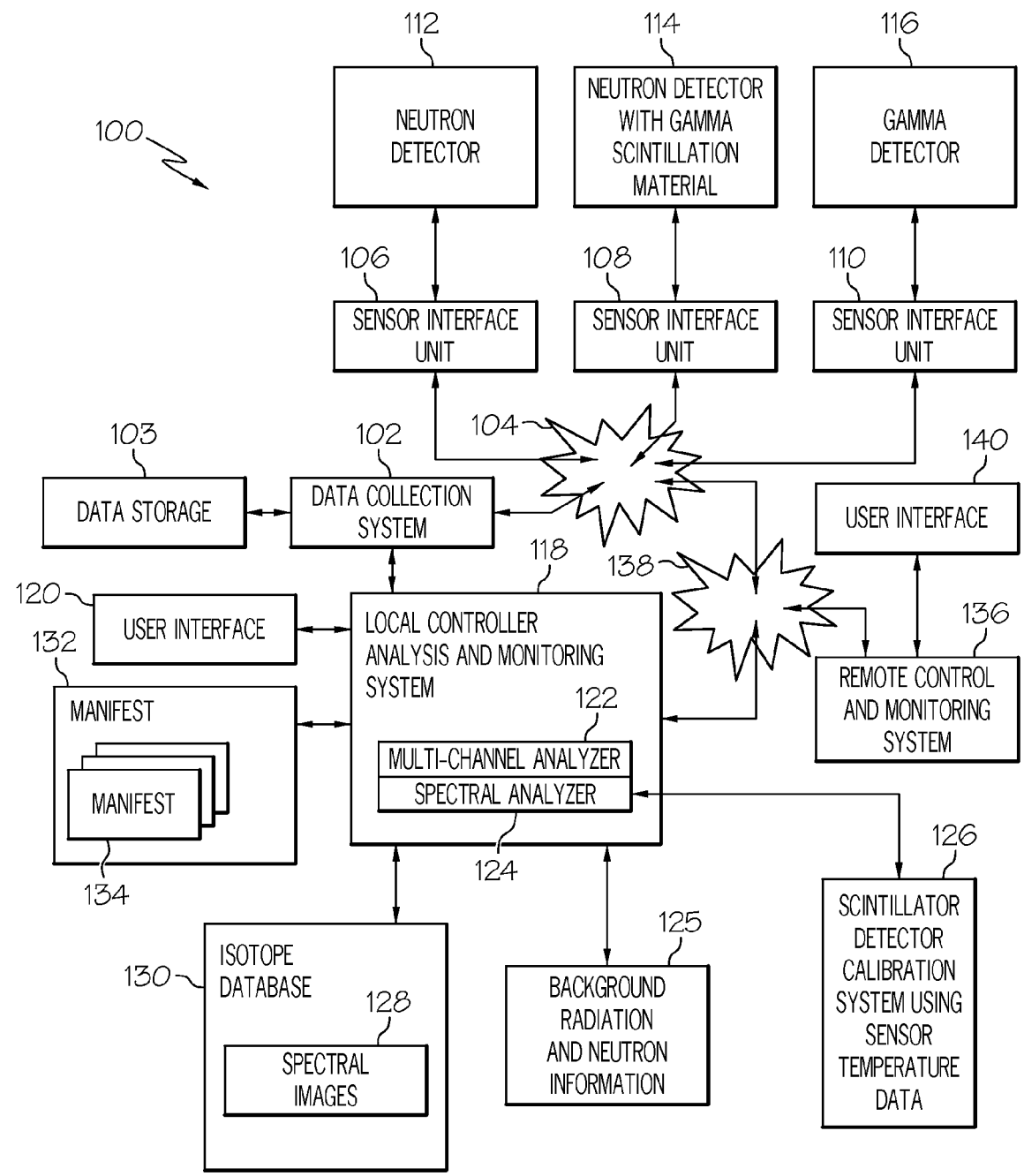
FIG. 1 is a block diagram illustrating an example of a detector system according to one embodiment of the present invention.

FIG. 1 is a block diagram illustrating one example of a neutron detector system 100 according to one embodiment of the present invention. In particular, FIG. 1 shows that a data collection system 102 is communicatively coupled via cabling, wireless communication link, and/or other communication links 104 with one or more high speed sensor interface units (SIU) 106, 108, 110. The high speed sensor interface units 106, 108, 110 each support one or more high speed scintillation (or scintillator) detectors, which in one embodiment comprise a neutron detector 112, a neutron detector with gamma scintillation material 114, and a gamma detector 116. Each of the one or more SIUs 106, 108, 110 performs analog to digital conversion of the signals received from the high speed scintillation detectors 112, 114, 116. An SIU 106, 108, 110 performs digital pulse discrimination based on one or more of the following: pulse height, pulse rise-time, pulse fall-time, pulse-width, pulse peak, and pulse pile-up filter.

The data collection system 110, in one embodiment, includes an information processing system (not shown) comprising data communication interfaces (not shown) for interfacing with each of the one or more SIUs 124. The data collection system 110 is also communicatively coupled to a data storage unit 103 for storing the data received from the SIUs 106, 108, 110. The data communication interfaces collect signals from each of the one or more high speed scintillation detectors such as the neutron pulse device(s) 112, 114 and the gamma detector 116. The collected signals, in this example, represent detailed spectral data from each sensor device 112, 114, 116 that has detected radiation. In one embodiment, the SIU(s) 124 can discriminate between gamma pulses and neutron pulses in a neutron detector 112. The gamma pulses can be counted or discarded. Also, the SIU(s) 106, 108, 110 can discriminate between gamma pulses and neutron pulses in a neutron detector with gamma scintillation 114. The gamma pulses can be counted, processed for spectral information, or discarded.

The data collection system 102, in one embodiment, is modular in design and can be used specifically for radiation detection and identification, or for data collection for explosives and special materials detection and identification. The data collection system 102 is communicatively coupled with a local controller and monitor system 118. The local system 118 comprises an information processing system (not shown) that includes a computer system(s), memory, storage, and a user interface 120 such a display on a monitor and/or a keyboard, and/or other user input/output devices. In this embodiment, the local system 118 also includes a multi-channel analyzer 122 and a spectral analyzer 124.

The multi-channel analyzer (MCA) 122 can be deployed in the one or more SIUs 106, 108, 110 or as a separate unit 122 and comprises a device (not shown) composed of many single channel analyzers (SCA). The single channel analyzer interrogates analog signals received from the individual radiation detectors 112, 114, 116 and determines whether the specific energy range of the received signal is equal to the range identified by the single channel. If the energy received is within the SCA, the SCA counter is updated. Over time, the SCA counts are accumulated. At a specific time interval, a multi-channel analyzer 122 includes a number of SCA counts, which result in the creation of a histogram. The histogram represents the spectral image of the radiation that is present. The MCA 122, according to one example, uses analog to digital converters combined with computer memory that is equivalent to thousands of SCAs and counters and is dramatically more powerful and less expensive than deploying the same or even a lesser number of SCAs.

A scintillation calibration system 126 uses temperature references from a scintillation crystal to operate calibration measures for each of the one or more high speed scintillation detectors 112, 114, 116. These calibration measures can be adjustments to the voltage supplied to the high speed scintillation detector, adjustments to the high speed scintillation detector analog interface, and or software adjustments to the spectral data from the high speed scintillation detector 112, 114, 116. For example, high speed scintillator detector 112, 114, 116, can utilize a temperature sensor in contact with the scintillation crystal and/or both in the photosensor of the detector to determine the specific operating temperature of the crystal. The specific operating temperature can be used as a reference to calibrate the high speed scintillation detector. The detector crystal and the photosensor both may have impacts on detector signal calibration from changing temperatures. A temperature chamber can be used to track the calibration changes of an individual detector, photosensor or mated pair across a range of temperatures. The calibration characteristics are then mapped and used as a reference against temperatures experienced in operation.

Histograms representing spectral images 128 are used by the spectral analysis system 124 to identify fissile materials or isotopes that are present in an area and/or object being monitored. One of the functions performed by the local controller 118 is spectral analysis, via the spectral analyzer 124, to identify the one or more isotopes, explosives, or special materials contained in a container under examination. In one embodiment, background radiation is gathered to enable background radiation subtraction. Background neutron activity is also gathered to enable background neutron subtraction. This can be performed using static background acquisition techniques and dynamic background acquisition techniques. Background subtraction is performed because there are gamma and neutron energies all around. These normally occurring gamma and neutrons can interfere with the detection of the presence of (and identifying) isotopes and nuclear materials. In addition, there can be additional materials other than the target giving off gammas and or neutrons. Therefore, the background gamma and neutron rate is identified and a subtraction of this background is performed to allow for an effective detection and identification of small amounts of radiation of nuclear material. This background and neutron information 125 is then passed to the local control analysis and monitoring system 118 so that precise and accurate monitoring can be performed without being hindered by background radiation. The dynamic background analysis technique used to perform background subtraction enables the neutron detector system 100 to operate at approximately 4 sigma producing an accuracy of detection above background noise of 99.999%.

After background subtraction, with respect to radiation detection, the spectral analyzer 124 compares one or more spectral images of the radiation present to known isotopes that are represented by one or more spectral images 128 stored in the isotope database 130. By capturing multiple variations of spectral data for each isotope there are numerous images that can be compared to one or more spectral images of the radiation present. The isotope database 130 holds the one or more spectral images 128 of each isotope to be identified. These multiple spectral images represent various levels of acquisition of spectral radiation data so isotopes can be compared and identified using various amounts of spectral data available from the one or more sensors. Whether there are small amounts (or large amounts) of data acquired from the sensor, the spectral analysis system 124 compares the acquired radiation data from the sensor to one or more spectral images for each isotope to be identified. This significantly enhances the reliability and efficiency of matching acquired spectral image data from the sensor to spectral image data of each possible isotope to be identified.

Once one or more possible isotopes are determined to be present in the radiation detected by the sensor(s) 112, 114, 116, the local controller 118 can compare the isotope mix against possible materials, goods, and/or products that may be present in the container under examination. Additionally, a manifest database 132 includes a detailed description (e.g., manifests 134) of the contents of a container that is to be examined. The manifest 134 can be referred to by the local controller 118 to determine whether the possible materials, goods, and/or products, contained in the container match the expected authorized materials, goods, and/or products, described in the manifest for the particular container under examination. This matching process, according to one embodiment of the present invention, is significantly more efficient and reliable than any container contents monitoring process in the past.

The spectral analysis system 124, according to one embodiment, includes an information processing system (not shown) and software that analyzes the data collected and identifies the isotopes that are present. The spectral analysis software is able to utilize more than one method to provide multi-confirmation of the isotopes identified. Should more than one isotope be present, the system 124 identifies the ratio of each isotope present. There are many industry examples of methods that can be used for spectral analysis for fissile material detection and isotope identification.

The data collection system 102 can also be communicatively coupled with a remote control and monitoring system 136 via at least one network 138. The remote system 136 comprises at least one information processing system (not shown) that has a computer, memory, storage, and a user interface 140 such as a display on a monitor and a keyboard, or other user input/output device. The networks 104, 138 can be the same networks, comprise any number of local area networks and/or wide area networks. The networks 104, 138 can include wired and/or wireless communication networks. The user interface 140 allows remotely located service or supervisory personnel to operate the local system 118; to monitor the status of shipping container verification by the collection of sensor units 106, 108, 110 deployed on the frame structure; and perform the operations/functions discussed above from a remote location.

Neutron Detector

The following is a more detailed discussion of a neutron detector such as the neutron detector 112 or 114 of FIG. 1. The neutron detector of various embodiments of the present invention provides high levels of efficiency with near zero gamma cross talk. The neutron detector is a high efficiency neutron detector that uses a scintillator medium coupled with fiber optic light guides with high speed analog to digital conversion and digital electronics providing digital pulse shape discrimination for near zero gamma cross talk.

The neutron detector of various embodiments of the present invention is important to a wide variety of applications: such as portal detectors, e.g., devices in which a person or object is passed through for neutron and gamma detection, fissile material location devices, neutron based imaging systems, hand held, mobile and fixed deployments for neutron detectors. The neutron detector in various embodiments of the present invention, for example, can utilize the Systems Integration Module for CBRNE sensors discussed in the commonly owned U.S. Pat. No. 7,269,527, which is incorporated by reference herein in its entirety.

Figure 2:
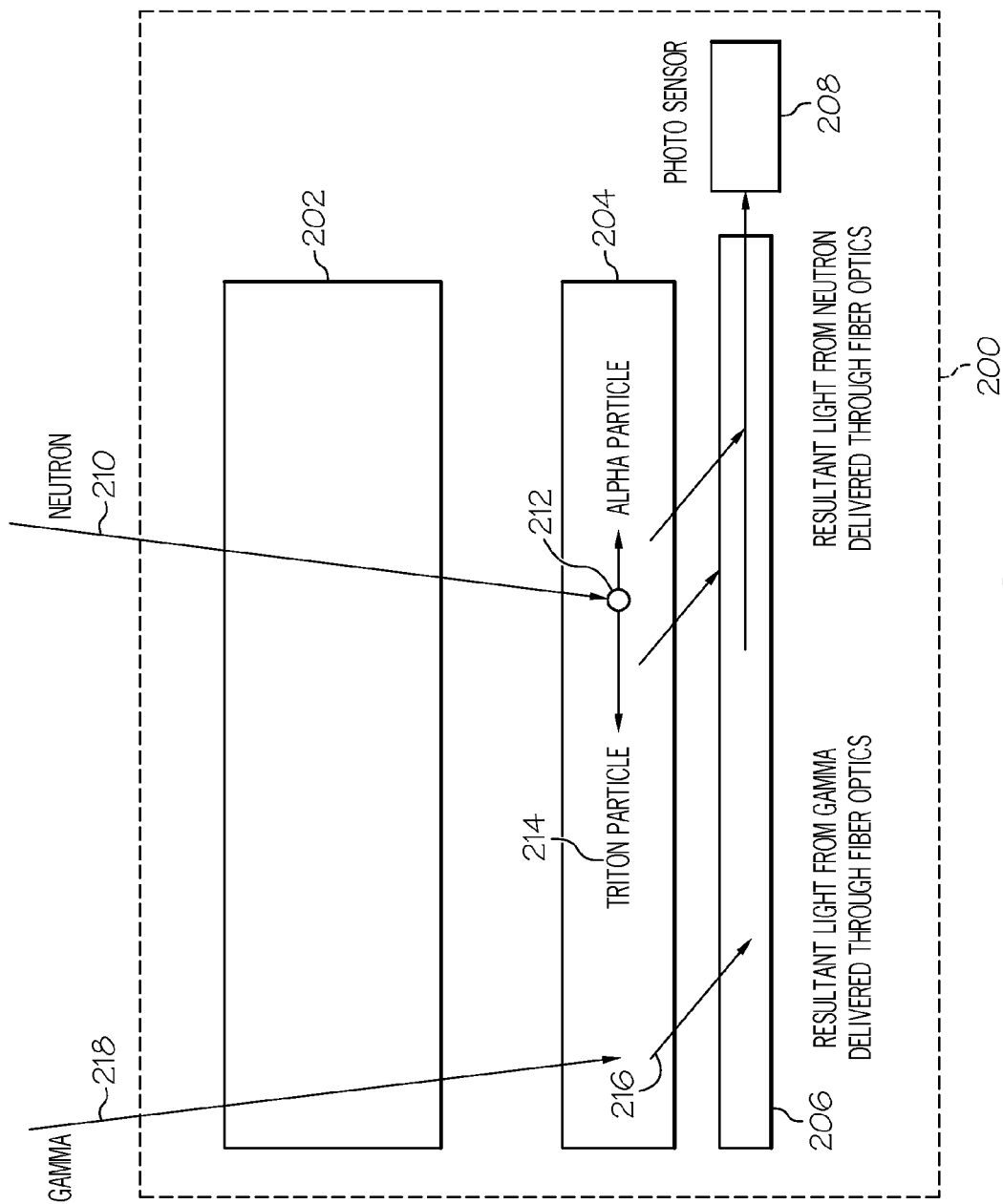
FIG. 2 is block diagram of a gamma and neutron detector according to one embodiment of the present invention.

FIG. 2 is a block diagram illustrating a more detailed view of a neutron detector 200 according to one embodiment of the present. In particular, FIG. 2 shows that the neutron detector 200 comprises a neutron moderator material 202 such as polyethylene and scintillation material 204 which can comprise, in this example, 6Li of 6LiF or any similar substance. In one embodiment, the 6LiF is mixed in a hydrogenous binder medium with a scintillation (or scintillator) material 204 and has a thickness of about (but not limited to) 0.1 mm to about 0.5 mm. The scintillator material 204, in one embodiment can comprise one or more materials such as (but not limited to) ZnS, ZnS(Ag), or NaI(Tl). One or more of these materials give the neutron detector 200 resolution for gamma signals that can be used in spectroscope analysis.

The moderator material 202 acts as a protective layer that does not allow light into the detector 200. Alternatively, a separate light shield can be applied to the outer shell of the detector layers to eliminate outside light interference. Also, the moderator material 202 can comprise interposing plastic layers that act as wavelength shifters. According to one embodiment, at least one plastic layer is adjacent to (and optionally contacting) the at least one light guide medium. According to one embodiment, the at least one light guide medium at the at least one scintillator layer is substantially surrounded by plastic that acts as a wavelength shifter. That is, the plastic layers (and/or optionally plastic substantially surrounding the light guide medium at the at least one scintillator layer) act(s) as wavelength shifter(s) that receive light photons emitted from the at least one scintillator layer (from neutron particles interacting with the at least one scintillator layer) and couple these photons into the at least one light guide medium. According to one embodiment, the at least one light guide medium at the at least one scintillator layer comprises fiber optic media that acts as a wavelength shifter (e.g., wave shifting fiber). This provides a more efficient means of collecting light out the end of the at least one light guide medium, such as when the light enters from substantially normal incidence from the outside of the at least one light guide medium.

An example of a moderator material that can be used with the present invention comprises dense polyethylene. The optimum moderator configuration, in one embodiment, is estimated at 2 inches of dense polyethylene. The moderator material 202 thermalizes the fast neutrons before they enter the detector 200. This thermalization of the fast neutrons allows the thermal neutron detector to perform at an optimum efficiency. Thermal neutron sensitive scintillator material that is useful in the fabrication of a neutron detector such as the detector 200 of FIG. 2 includes, but is not limited to 6Li—ZnS, 10BN, and other thin layers of materials that release high energy He or H particles in neutron capture reactions. Such materials can be 6Li- or 10B-enriched ZnS, 10BN, or other phosphors that contain Li or B as an additive. Examples of such scintillator plastics include BC 480, BC 482, and BC 484, all available from the French company St. Gobain, SA.

The neutron detector 200 also comprises a light carrying medium 206 such as fiber optics that is coupled to a photosensor 208. The photosensor 508, in one embodiment, comprises a photomultiplier tube or an avalanche diode. The 6Li or 6LiF and scintillator material 204 is optically coupled to the light guide medium 206. The light guide medium 206, in one embodiment, includes a tapered portion that extends from one or both ends of the scintillation layer 204 to guide the light to a narrowed section. This narrowed section is optically coupled to the photosensor 208 at the tapered portion. The photosensor, such as the photomultiplier tube, is tuned to operate close to the light frequency of the light photons generated from the scintillation material and carried by the light guide medium.

The scintillation material 204 is excited by an incident neutron 210 that is slowed by the moderator material 202. The incident material reacts by emitting an alpha particle 212 and triton 214 into the neighboring scintillation material 204, which can be, in this example, a phosphor material. The scintillation material 204 is energized by this interaction and releases the energy as photons (light) 216. The photons 216 travel into the light carrying medium 206 and are guided to the ends of the medium 206 and exit into the photosensor 208. In one embodiment, the light guide medium 206 is a wavelength shifter. The wavelength shifter shifts blue or UV light to a wavelength that matches the sensitivity of a photosensor 208, avalanche sensor, or diode sensor. It should be noted that a gamma particle 218 can also hit the scintillation material 204, which creates photons 216 that are received by the photosensor 208.

The neutron detector 200 provides significant improvements in form and function over a helium-3 neutron detector. The neutron detector 200 is able to be shaped into a desired form. For example, the scintillator layer(s) and moderator material can be curved and configured for up to a 360 degree effective detection angle of incidence. The at least one scintillator layer and moderator material can be flat and designed as a detector panel. The neutron detector 200 comprises a uniform efficiency across the detector area. The neutron detector 200 can comprise multiple layers to create an efficiency which is substantially close to 100%.

Figure 3:
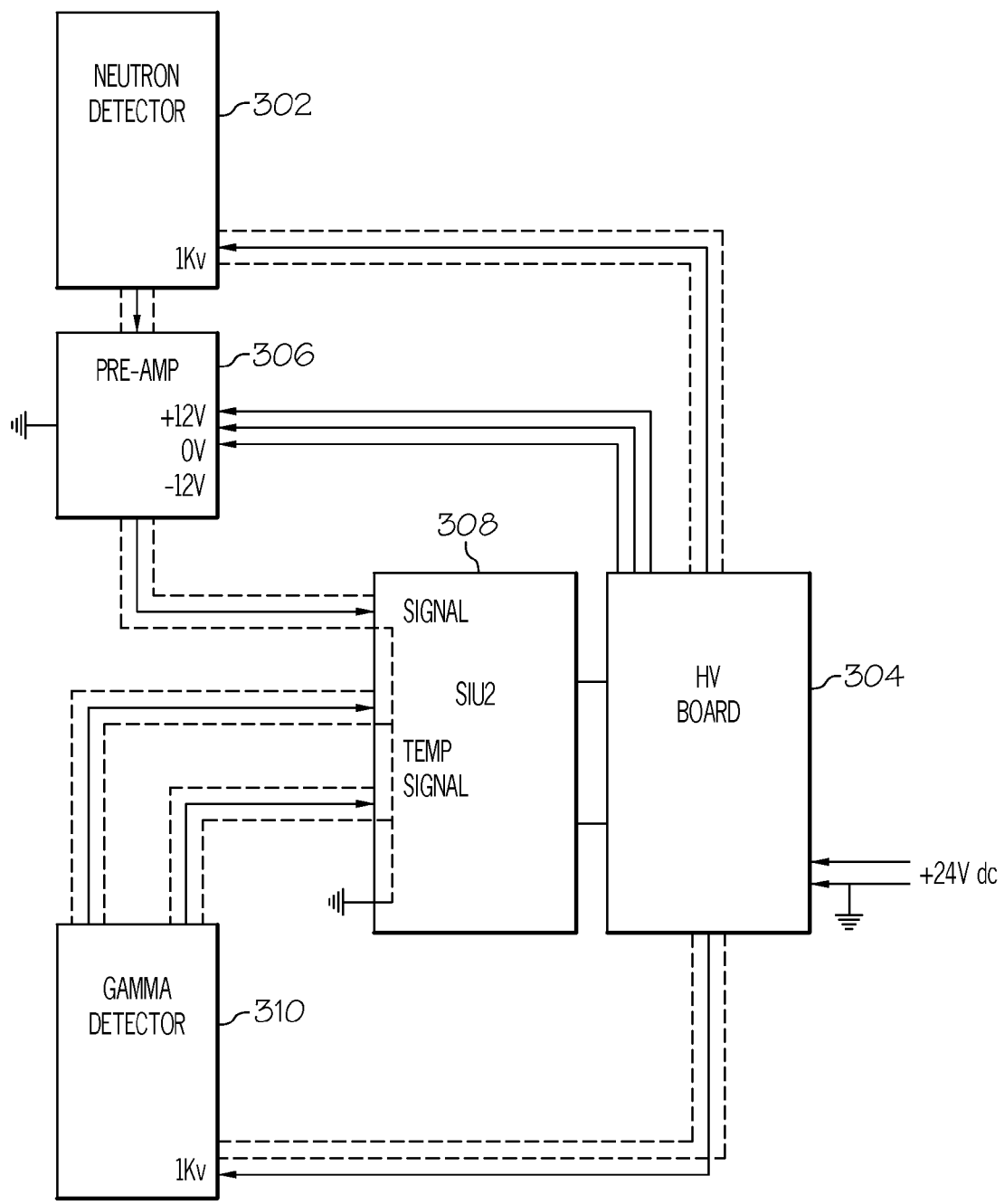
FIG. 3 is a schematic illustrating a neutron detector and its supporting components according to one embodiment of the present invention.

FIG. 3 is a schematic that illustrates various components that are used to support a neutron detector such as the neutron detectors 112, 114 shown in FIG. 1. In one embodiment, the various electrical components shown in FIG. 3 provide a signal sampling rate of 50 million samples per second or faster. In particular, FIG. 3 shows a neutron detector 302 electrically coupled to a high voltage board 304, which provides power to the neutron detector 302. The neutron detector 302 generates analog signals that are received by a pre-amp component 306, which is also electrically coupled to the high voltage board 304. The pre-amp 306, in one embodiment, drives the detector signal processing rate close to the decay time of the scintillator material in the detector 302. This enables pulses to be delivered without distortion to a set of electronics that perform analog to digital conversion, such as the SIU 308. The SIU 308 is electrically coupled to the pre-amp 306, high voltage board 304, and a gamma detector 310 (in this embodiment). The analog signals from the neutron detector 302 are processed by the pre-amp 306 and sent to the SIU unit 308. The SIU 308 performs an analog-to-digital conversion process on the neutron detector signals received from the pre-amp 306 and also performs additional processing, which has been discussed above.

Figure 4:
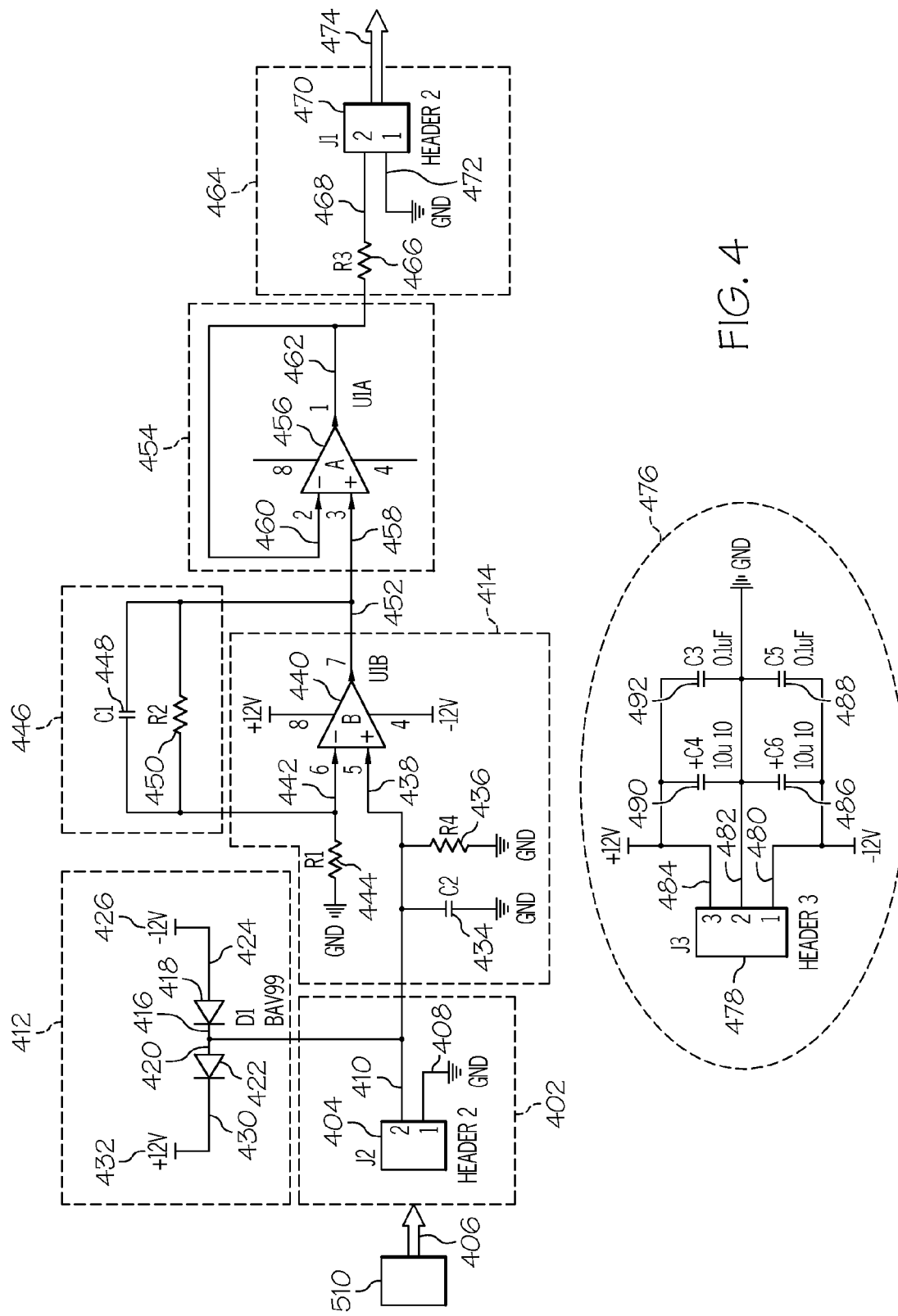
FIG. 4 is a circuit diagram for a pre-amp according to one embodiment of the present invention.

FIG. 4 shows a more detailed schematic of the pre-amp component 306. The pre-amp component 306 shown in FIGS. 3 and 4 is enhanced to reduce the pulse stretching and distortion typically occurring with commercial preamps. The pre-amp 306 of FIGS. 3 and 4 removes any decay time constant introduced by capacitive and or inductive effects on the amplifier circuit. For example, the impedance, in one embodiment, is lowered on the input of the preamp that is attached to the output of a photomultiplier tube 510, 512, 514, 516 (FIG. 5) to maintain the integrity of the pulse shape and with the preamp output signal gain raised to strengthen the signal.

The pre-amp circuit 306 of FIG. 4 includes a first node 402 comprising a header block 404 that is electrically coupled to the output 406 of the neutron detector photomultiplier 510 as shown in FIG. 4. A first output 408 of the header block 404 is electrically coupled to ground, while a second output 410 of the header block 404 is electrically coupled a second node 412 and a third node 414. In particular, the second output 410 of the header block 404 is electrically coupled to an output 416 of a first diode 418 in the second node 412 and an input 420 of a second diode 422. The input 424 of the first diode 418 is electrically coupled to a voltage source 426. The output of the first diode is electrically coupled to the input of the second diode. The output 440 of the second diode 422 is electrically coupled to a second voltage source 442.

The third node 414 comprises a capacitor 444 electrically coupled to ground and a resistor 436 that is also electrically coupled to ground. The capacitor 444 and the resistor 436 are electrically coupled to the second output 410 of the header block 406 and to a first input 438 of an amplifier 440. A second input 442 of the amplifier 440 is electrically coupled to a resistor 444 to ground. The amplifier 440 is also electrically coupled to a power source as well. A fourth node 446 is electrically coupled to the second input 442 of the amplifier in the third node 414. The fourth node 446 includes a capacitor 448 and a resistor 450 electrically coupled in parallel, where each of the capacitor 448 and resistor 450 is electrically coupled to the second input 442 of the amplifier 440 in the third node 414 and the output 452 of the amplifier 440 in the third node 414.

The output 452 of the amplifier 440 in the third node 414 is electrically coupled to a fifth node 454 comprising another amplifier 456. In particular, the output 452 of the amplifier 440 of the third node 414 is electrically coupled to a first input 458 of the amplifier 456 in the fifth node 454. A second output 460 of the amplifier 456 in the fifth node 454 is electrically coupled to the output 462 of the amplifier 456. The output 462 of the amplifier 456 is electrically coupled to a sixth node 464. In particular, the output 462 of the amplifier 456 in the fifth node 454 is electrically coupled to a resistor 466 in the sixth node 464, which is electrically coupled to a first input 468 of another header block 470. A second input 472 of the header block 470 is electrically coupled to ground. An output 474 of the header block 470 is electrically coupled to an analog-to-digital converter such as an SIU discussed above.

The pre-amp circuit 306 of FIG. 4 also includes a seventh node 476 comprising a header block 478. A first 480 and third 484 output of the third header block 478 is electrically coupled to a respective voltage source. A second output 482 is electrically coupled to ground. The first output 480 is electrically coupled to a first 486 and second 488 capacitor, which are electrically coupled to the second output 482. The third output 484 is electrically coupled to a third 490 and a fourth 492 capacitor, that are electrically coupled to the second output 482 as well.

Figure 5:
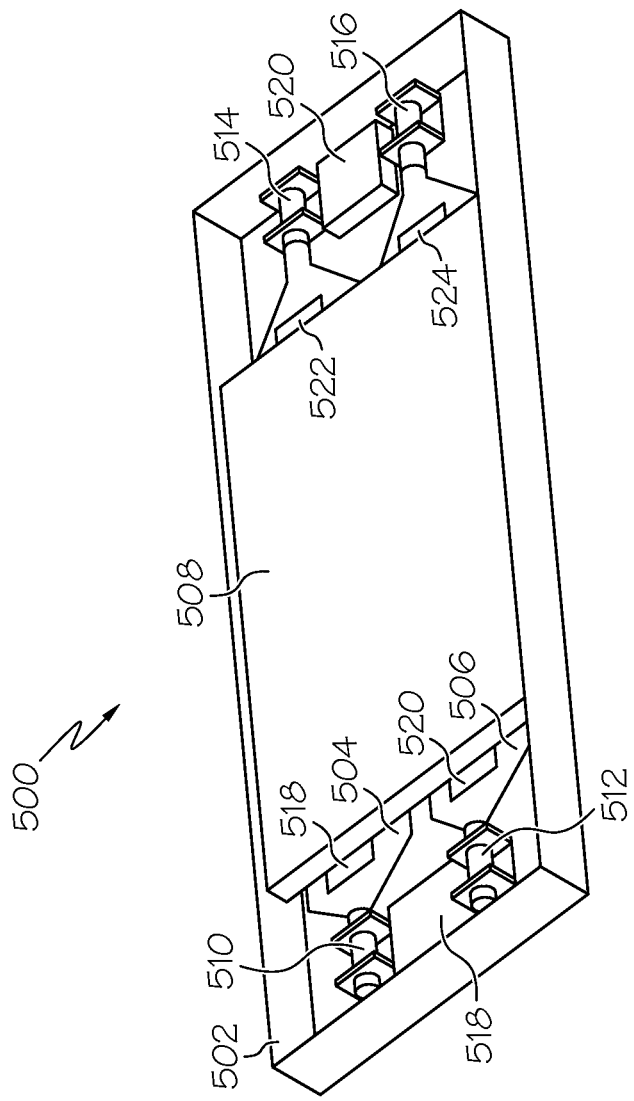
FIG. 5 is top-planar view of a neutron detector according to one embodiment of the present invention.

FIG. 5 shows a top planar cross-sectional view of a neutron detector component 500 that can be implemented in the system of FIG. 1. In particular, FIG. 5 shows a housing 502 comprising one or more thermal neutron detectors 504, 506. The thermal neutron detector 504, 506, in this embodiment, is wrapped in a moderator material 508. Photomultiplier tubes 510, 512, 514, 516 are situated on the outer ends of the thermal neutron detectors 504, 506. Each of the photomultiplier tubes 510, 512, 515, 516 is coupled to a preamp 518, 520, 542, 544. Each preamp 518, 520, 522, 524 is electrically coupled to a sensor interface unit 556, 528. Each preamp 518 can be electrically coupled to its own SIU 526, 528 or to an SIU 526, 528 that is common to another preamp 520, as shown in FIG. 5.

The thermal neutron detector 504, 506 is wrapped in a moderator material 508 comprising moderator efficiencies that present a greater number of thermalized neutrons to the detector 504, 506 as compared to conventional neutron detectors. A neutron moderator is a medium that reduces the speed of fast neutrons, thereby turning fast neutrons into thermal neutrons that are capable of sustaining a nuclear chain reaction involving, for example, uranium-235. Commonly used moderators include regular (light) water (currently used in about 75% of the world's nuclear reactors), solid graphite (currently used in about 20% of nuclear reactors), and heavy water (currently used in about 5% of reactors). Beryllium has also been used in some experimental types, and hydrocarbons have been suggested as another possibility.

The following is a non-exhaustive list of moderator materials that are applicable to one or more embodiments of the present invention. Hydrogen, as in ordinary water ("light water"), in light water reactors. The reactors require enriched uranium to operate. There are also proposals to use the compound formed by the chemical reaction of metallic uranium and hydrogen (uranium hydride—$UH_3$) as a combination fuel and moderator in a new type of reactor. Hydrogen is also used in the form of cryogenic liquid methane and sometimes liquid hydrogen as a cold neutron source in some research reactors: yielding a Maxwell-Boltzmann distribution for the neutrons whose maximum is shifted to much lower energies. Deuterium, in the form of heavy water, in heavy water reactors, e.g. CANDU. Reactors moderated with heavy water can use unenriched natural uranium. Carbon, in the form of reactor-grade graphite or pyrolytic carbon, used in e.g. RBMK and pebble-bed reactors, or in compounds, e.g. carbon dioxide. Lower-temperature reactors are susceptible to buildup of Wigner energy in the material. Like deuterium-moderated reactors, some of these reactors can use unenriched natural uranium. Graphite is also deliberately allowed to be heated to around 2000 K or higher in some research reactors to produce a hot neutron source: giving a Maxwell-Boltzmann distribution whose maximum is spread out to generate higher energy neutrons. Beryllium, in the form of metal, is typically expensive and toxic, and so its use is limited. Lithium-7, in the form of a fluoride salt, typically in conjunction with beryllium fluoride salt (FLiBe) is the most common type of moderator in a Molten Salt Reactor. Other light-nuclei materials are unsuitable for various reasons. Helium is a gas and is not possible to achieve its sufficient density, lithium-6 and boron absorb neutrons.

In addition to the neutron detector configuration shown in FIG. 5, a multi-layered neutron detector can also be used in one or more embodiments of the present invention. In this embodiment a full neutron detector is constructed with moderator material and multiple layers of the neutron detector device. A second full neutron detector with moderator material is positioned directly behind the first to create a multilayered neutron detector system. In another embodiment, moderator materials are interleaved between one or more of the detector layers. Additional moderator materials may be applied surrounding this detector configuration.

Also, one or more embodiments of the present invention can be utilized as a passive neutron detection system for shielded nuclear materials such as highly enriched uranium. In this embodiment, the neutron detector discussed above provides strong detection capabilities for shielded nuclear material. Additional detector configurations may be added to increase the shielded nuclear materials detection capability. The thermal neutron detector system 100 may also add one or more fast neutron detectors designed as a high performance detector with modified preamp and connection to the sensor interface unit for high speed digital data analysis. The sandwich neutron detector design discussed above can be used to increase the detection capability of shielded nuclear materials. A more efficient moderator material may be developed to increase the number of fast neutrons that are thermalized and presented to the neutron detector. Also, the neutron detector of the various embodiments of the present invention can use moderator materials for a portion of the detector surface area to enable detection of thermal neutrons and to convert fast neutrons to thermal neutrons.

Experimental Information

Based on the processing speeds and features of the proprietary sensor interface unit (SIU) 106, 108, 100, (which is commercially available from Innovative American Technologies, Inc.) experiments were performed with gamma/neutron pulse differentiation techniques. The various embodiments of the present invention were able to effectively eliminate the gamma detections without impacting the neutron detection efficiencies. After extensive testing, it was found that the conventional multichannel analyzers and detector electronics in the industry with primarily applied features on the analog side of the electronics ran at slower speeds than the neutron detector pulse. The pulses were subsequently altered (slowed down) to address the slower MCA electronics. Slowing the pulse distorts the shape of the pulse, which causes problems in differentiating between gamma and neutron pulses. Also, when the electronics extend the pulse, an opportunity is created for pulse stacking to occur, where the overall envelope is larger than that of a single neutron pulse, rendering the pulse shape analysis unreliable at best.

Therefore, the neutron pre-amp 306 (FIG. 3) according to one or more embodiments of the present invention is enhanced to reduce the pulse stretching and distortion typically occurring with commercial pre-amps. That is, the pre-amp circuit is configured to operate substantially close to a decay time of the scintillator layer when interacting with neutrons, and without adding further extension (distortion) to the electrical signal output from the pre-amp. The pre-amp 306 removes decay time constant that may be introduced by capacitive and or inductive effects on the amplifier circuit. For example, the impedance can be lowered on the input of the pre-amp attached to the output from the photomultiplier tube to maintain the integrity of the pulse shape, and optionally with the pre-amp output gain raised to strengthen the output signal.

The neutron detector 200 improves the gamma discrimination by utilizing the preamp 306 to keep the pulse as close as possible to its original duration and shape with a pulse duration of approximately 250 nanoseconds (in one embodiment). This improves linearity and increases the ability to process more counts per second, especially in a random burst where multiple gamma and/or neutron pulse events may be blurred into one pulse. The programmable gain and offset of the SIU 106, 108, 110 analog front end presents the pulse signal to a 50 MHz high speed/high resolution digitizer which feeds the Field programmable Gate Array (FPGA) that includes proprietary hardware real-time Pulse DSP programmable filters from Innovative American Technology (IAT), Inc. The high speed analog-to-digital conversion circuit (within the SIUs) can sample the fastest pulse with approximately 15 points of high resolution data. These programmable filters are used in the second stage of signal processing to eliminate noise and most gamma pulses via a LLD (low level discriminator) or noise canceller as well as employing a pulse rise time filter. Pulses must meet a minimum rise time to be considered for analysis. The next stage of signal processing occurs at a pulse width filter, which measures the duration of the pulse at a point where the shape widens when the pulse originates from a neutron reaction. Gamma pulses have a clean and rapid decay, whereas neutron interaction with the detector produces an extended fall time.

The result of the above signal processing is that the speed of the SIU 106, 108, 110 system hardware and embedded processor clearly differentiates between a neutron pulse and a gamma pulse. This enables the neutron detector system 100 to eliminate nearly 100% of the gamma pulses received by the neutron detector without impacting the neutron detector efficiencies. Subsequent testing at various laboratories supported zero gamma detection (zero gamma cross-talk) under high gamma count rates and high gamma energy levels. For example, testing with Cs137 in the inventor's lab (16 microcuries) placed directly in front of the neutron detector, using the IAT commercially available SIU and RTIS application components, provided the following results: 1/10,000,000 (one in ten million) gamma pulse counts using Cs137 for the test. The neutron detector 200 was deployed using the IAT detection, background subtraction and spectral analysis system software operating at 4.2649 sigma which translates to a false positive rate of 1/100,000 (one in one hundred thousand) or an accuracy rate of 99.999%.

An Example of a Discrimination Process

Figure 6:
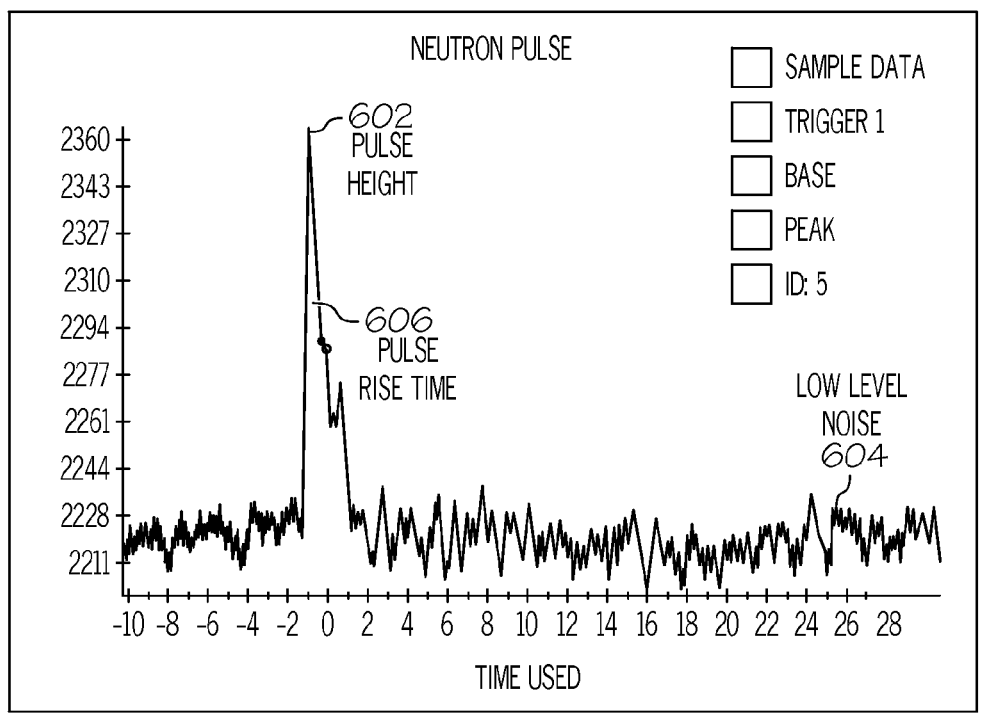
FIG. 6 is a graph illustrating a neutron pulse generated from a neutron detector according to one embodiment of the present invention.
Figure 7:
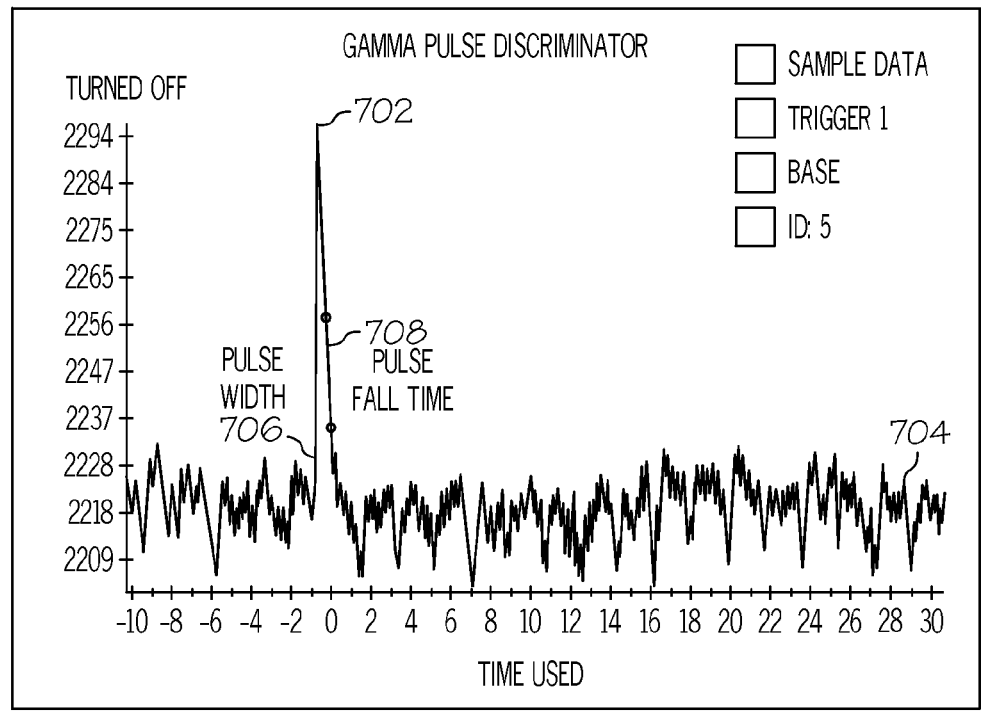
FIG. 7 is a graph illustrating a gamma pulse generated from a neutron detector according to one embodiment of the present invention.

FIGS. 6 and 7 show a neutron pulse and a separate gamma pulse, respectively, generated from the neutron detector 200 and digitally converted for processing. The neutron pulse in FIG. 6 represents a pure pulse without distortion, meets the pulse height 602 requirements, is above the noise threshold filter 604, meets the pulse rise-time requirements 604, and has a much wider base than the example gamma pulse in FIG. 7, accordingly identifying the pulse as a neutron pulse. The gamma pulse in FIG. 7, meets the pulse height requirement, is above the noise threshold filter, does not meet the pulse rise width 702 requirement, and is therefore eliminated through pulse shape discrimination (which comprise discrimination by any one or more of the following signal features: pulse height, pulse width, pulse rise time, and/or pulse fall time).

Therefore, the neutron detector 200 provides various improvements over conventional helium-e type detectors. For example, with respect to the neutron detector 200, the pulse height allows the detector system 100 to provide better discrimination against lower energy gamma. The Li+n reaction in the neutron detector 200 produces 4.78 Mev pulse. The He3+n reaction only produces 0.764 Mev pulse. With respect to wall effects, the neutron detector 200 is thin so a very small fraction of the gamma energy is absorbed making very small gamma pulses. Pile up of pulses can produce a larger apparent pulse. However this is avoided with the fast electronics. The walls of the He3 detectors capture some energy, which broadens the pulse. Thus, such implementation typically uses large size tubes. With a broad neutron pulse fast electronics cannot be used to discriminate against gamma pulses during pile up without cutting out some of the neutron pulse energy.

With respect to pulse width, the neutron pulse width is narrower in the neutron detector 200 than in He3 detectors. This makes the use of fast electronics more beneficial. With respect to, thermal neutron efficiency He3 is very efficient 90% at 0.025 eV neutrons. However He3 efficiency drops off rapidly to 4% for 100 ev neutrons. Because He3 is a gas a large volume detector is needed to get this efficiency. He3 efficiency coupled with a moderator assembly is estimated at between 30% down to 1% across the energy range and depends on He3 volume. The neutron detector 200 is a solid material, and smaller volumes can be used. Multiple layers of the neutron detector 200 raise the overall detector system efficiency. In one embodiment of the present invention, a four layer configuration of the neutron detector 200 was constructed that reached efficiencies of close to 100%. The neutron detector 200 efficiency coupled with the moderator assembly is estimated at 30% across the energy range.

The neutron detector 200 is advantageous over conventional helium-3 neutron detectors for the following reasons. The neutron detector can be shaped into any desired form. The neutron detector comprises uniform efficiency across the detector area. Also, multiple layers of the detector can create an efficiency which is close to 100%.

Detection of Shielded HEU (Passively)

The neutron detector 200, in one embodiment, is an effective passive detector of specialized nuclear materials. The most difficult to detect is typically highly enriched uranium (HEU). More difficult is shielded highly enriched uranium. The HEU detection capabilities were analyzed and the conclusions are discussed below. The useful radioactive emissions for passively detecting shielded HEU are neutron and gamma rays at 1 MeV from decay of U-238. The neutrons offer the best detection option. The gamma rays with energy below 200 KeV are practical for detecting only unshielded HEU since these are too easily attenuated with shielding. The most effective detection solutions will place detectors with the largest possible area and most energy-specificity within five meters and for as long a time as possible since: (a.) at distances of 10 meters or more, the solid angle subtended by the detector (~detector area/distance2) from a 50 kg HEU source is likely to reduce the signal as much as any reasonable size shielding, and (b) with sufficient time for the detector to detect neutron counts and photon counts within a narrow enough photon energy range, even signals below the background can be detected.

In one model applicable to one or more embodiments of the present invention, it is assumed that the HEU core is shielded externally by lead. The linear attenuation coefficient, defined as the probability per unit distance that a gamma ray is scattered by a material, is a function of both the material and the energy of the gamma ray. Steel and concrete have linear attenuation coefficients at 1 MeV that are not all that different from lead, so the conclusions will be roughly similar even with other typical shielding materials. In addition to the external shield, the mass of HEU itself acts to shield gamma rays (self-shielding). The number of neutrons and gamma rays that reach the detector is limited by the solid angle subtended by the detector from the source. Finally, detection involves reading enough counts of neutrons and gamma rays to be able to ascertain a significant deviation from the background and the detector only detects a fraction of those neutron and gamma rays that are emitted due to detection inefficiencies. Each of these factors when put together forms a "link budget" and is explained below.

Nuclear theory is used to estimate the maximum distance possible for passive detection of a lead-shielded HEU spherical core using both U-238 and U-232 signals. The distance compared against variables of interest including detector area, detection time, shield thickness, and mass of the HEU core. Detection distance depends on amount of HEU and its surface area, shielding, detector area, distance, and time available to detect the emissions. Maximum detection distance is dependent on these factors. The neutron emissions and the neutron detector 200 are used, in this example, to enable neutron detection to four counts above background noise levels. The low number neutron counts and the low number 1 MeV gamma counts are used to identify the source as a high probability of shielded HEU.

Neutron Emissions of U-238, U-235, and U-234

The neutron "link budget" is not easily amenable to analytical approximation as it is for gammas. For a comparison with gammas, the basics of neutron emissions and attenuation are presented here in the specific case of weapons grade Uranium (WgU). Weapons grade Uranium (WgU) emits neutrons at the rate of roughly 1/s/kg with an energy distribution centered around 1 MeV—primarily due to spontaneous fission of Uranium isotopes, with each of 234, 235, and 238 contributing roughly equal numbers of neutrons given their relative composition in WgU. These energetic neutrons also have mean free path lengths of 2-6 cm in most shielding materials (tungsten, lead, etc.) whereas 1 MeV gammas are only ~1 cm by comparison. A 24 kg WgU sample with tungsten tamper emits 60 neutrons per second in addition to 60 1 MeV gamma rays per second at the surface of the sample. The path loss through free space is equivalent for both forms of radiation. Although neutrons may pass through shielding further than 1 MeV gammas, the difference is small enough that detection of shielded HEU using neutrons and the identification of shielded HEU through the combined detection of low counts for both neutrons and 1 MeV gamma is viable.

Gamma Emissions of U-238, U-235, and U-232

Uranium consists of multiple isotopes. By definition highly enriched Uranium (HEU) has more than 20%13 of the isotope U-235 which is fissile, and weapons grade Uranium contains over 90%14 U-235. Radioactive decay of U-235 results in gamma rays at 185 KeV, but shielding too easily attenuates these and so they are not useful for detecting shielded HEU. HEU also contains the isotope U-238—the more highly enriched, the less the percentage of U-238. A conservative assumption for detection using U-238 emissions is that HEU or weapons grade Uranium contains at least 5% U-238 by weight. U-232 may also be present in trace quantities (parts per trillion).

U-238 emits 81 gammas per second per gram at 1.001 MeV. This number can also be derived using first principles and nuclear data, but results in only a slightly higher value based on data from U-232's decay chain produces even more penetrating gamma rays than U-238. The most important gamma emitter in the U-232 decay chain is Tl-208, which emits a 2.6 MeV gamma ray when it decays. These gamma rays can be effectively used to detect the presence of HEU if U-232 is known to be a contaminant, even to the effect of a few hundred parts per trillion. Embodiments of the present invention can similarly arrive at the rates for U-232, the most penetrating of which has emissions at 2.614 MeV at a rate of 2.68×1011 gammas per gram per second.

In an analysis of the neutron detector system 100 it was determined that the ability to create a large neutron detector surface area with enhanced performance through modifications to the conventional preamp, use of digital electronics described in the sensor interface unit, advanced background subtraction methods and advanced spectral analysis methods, the system 100 was able to detect and identify special nuclear materials such as highly enriched uranium and shielded highly enriched uranium at quantities below 24 kilograms through a combination of neutron and gamma detections.

The passive scintillation detector system discussed above can be configured to detect and identify shielded highly enriched uranium based on low neutron counts coupled with low 1 MeV gamma counts. The system detects and identifies highly enriched uranium based on low level neutron counts coupled with low gamma counts at 1 MeV or greater energies coupled with gamma ray energy associated with HUE that are below 200 KeV.

The passive scintillation detector system discussed above can also be configured as a horizontal portal, a truck or bomb cart chassis, a spreader bar of a gantry crane, a straddle carrier, a rubber tired gantry crane, a rail mounted gantry crane, container movement equipment, a truck, a car, a boat, a helicopter, a plane or any other obvious position for the inspection and verification of persons, vehicles, or cargo. The system can be configured for military operations or military vehicles, and for personal detector systems. The system can also be configured for surveillance and detection in protection of metropolitan areas, buildings, military operations, critical infrastructure such as airports, train stations, subway systems or deployed on a mobile platform such as a boat, a vehicle, a plane, an unmanned vehicle or a remote control vehicle.

Information Processing System

Figure 8:
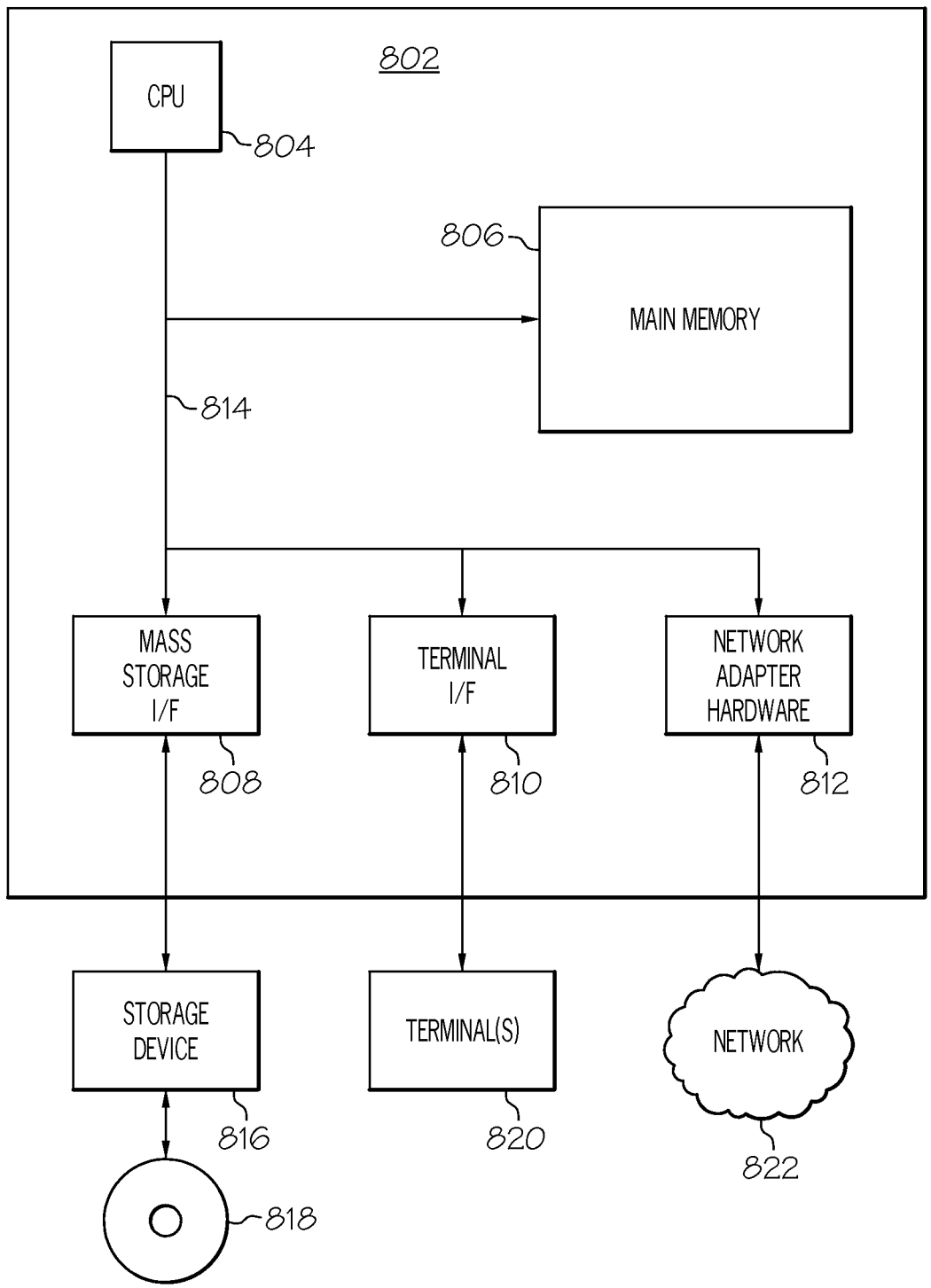
FIG. 8 is a block diagram illustrating a detailed view of an information processing system according to one embodiment of the present invention.

FIG. 8 is a block diagram illustrating a more detailed view of an information processing system 800 according to one embodiment of the present invention. The information processing system 800 is based upon a suitably configured processing system adapted to be implemented in the neutron detection system 100 of FIG. 1. Any suitably configured processing system is similarly able to be used as the information processing system 800 by embodiments of the present invention such as an information processing system residing in the computing environment of FIG. 1, a personal computer, workstation, or the like.

The information processing system 800 includes a computer 802. The computer 802 has a processor(s) 804 that is connected to a main memory 806, mass storage interface 808, terminal interface 810, and network adapter hardware 812. A system bus 814 interconnects these system components. The mass storage interface 808 is used to connect mass storage devices, such as data storage device 816, to the information processing system 800. One specific type of data storage device is an optical drive such as a CD/DVD drive, which may be used to store data to and read data from a computer readable medium or storage product such as (but not limited to) a CD/DVD 818. Another type of data storage device is a data storage device configured to support, for example, NTFS type file system operations.

In one embodiment, the information processing system 800 utilizes conventional virtual addressing mechanisms to allow programs to behave as if they have access to a large, single storage entity, referred to herein as a computer system memory, instead of access to multiple, smaller storage entities such as the main memory 806 and data storage device 816. Note that the term "computer system memory" is used herein to generically refer to the entire virtual memory of the information processing system 800.

Although only one CPU 804 is illustrated for computer 802, computer systems with multiple CPUs can be used equally effectively. Embodiments of the present invention further incorporate interfaces that each includes separate, fully programmed microprocessors that are used to off-load processing from the CPU 804. Terminal interface 810 is used to directly connect one or more terminals 820 to computer 802 to provide a user interface to the computer 802. These terminals 820, which are able to be non-intelligent or fully programmable workstations, are used to allow system administrators and users to communicate with the information processing system 800. The terminal 820 is also able to consist of user interface and peripheral devices that are connected to computer 802 and controlled by terminal interface hardware included in the terminal I/F 810 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 800. The network adapter hardware 812 is used to provide an interface to a network 822. Embodiments of the present invention are able to be adapted to work with any data communications connections including present day analog and/or digital techniques or via a future networking mechanism.

Although the various embodiments of the present invention are described in the context of a fully functional computer system, those skilled in the art will appreciate that embodiments are capable of being distributed as a program product via CD or DVD, e.g. CD 818, CD ROM, or other form of recordable media, or via any type of electronic transmission mechanism.

Example of Optical Coupling of Fibers with Photosensor

Figure 9A:
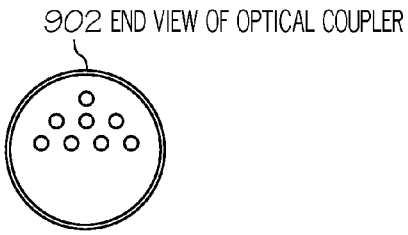
FIG. 9 is a block diagram showing one example of optically coupling optical fibers from neutron detector to a photosensor; in accordance with various embodiments of the present invention.
Figure 9B:
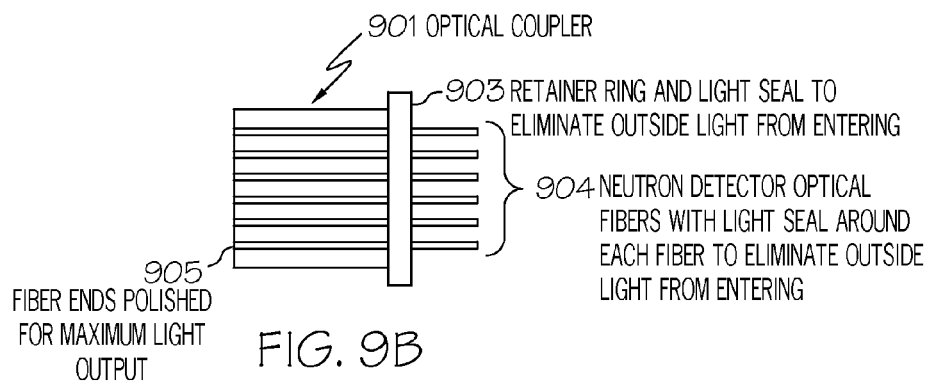
Figure 9C:
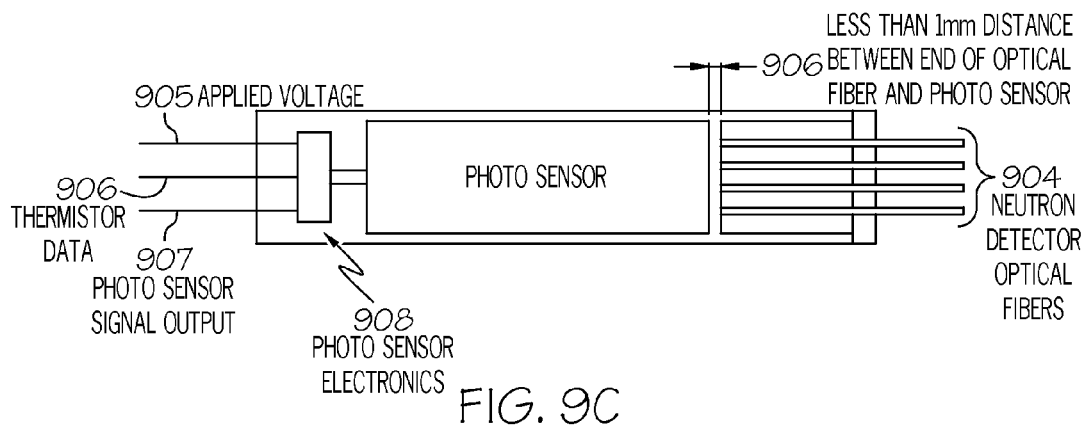

FIG. 9 shows a technical approach to optically couple optical fibers that deliver light photons from the scintillation material of one or more detectors to a photo sensor, such as a photo-multiplier tube. An optical coupler 901 and retaining ring 903 retains the ends of a bundle of optical fibers 904 so that the optical coupler can be plugged into a photo sensor receptacle. The ends of the fibers 904 are mechanically held adjacent to the photo sensor optical input by the optical coupler 901. The photo sensor typically receives the light photons from the fibers 904 and amplifies (e.g., multiplies) the optical signal and generates therefrom an electrical signal that is electrically coupled via photo sensor electronics 908 as an output electrical signal 907 representing the light input detected by the photo sensor.

FIG. 9 illustrates methods used to connect the fiber optic media 904 to the photo-sensor through the use of a detector coupler 901. The fiber optics 904 are inserted into the optical coupler 901 with an example end view of the optic coupler shown as item 902. The optical coupler seals the fibers 904 into the coupler 901 and the coupler 901 to a housing to eliminate outside light from reaching the photo sensor. The photo sensor is supplied with voltage 905, sensor signal output connectors 907 and thermistor and thermistor connections 906. The thermistor 906 monitors the photo sensor temperature.

The ends of the fiber optic media 904 are polished to enable optimum light delivery to the photo sensor. The optical coupler 901 and photo sensor placement in the housing places the ends of the fiber optic 904 equal to or less than 1 mm apart 906 from the photo sensor.

Alternative Arrangements of Optical Fiber Media and Detector Layers

Figure 10A:
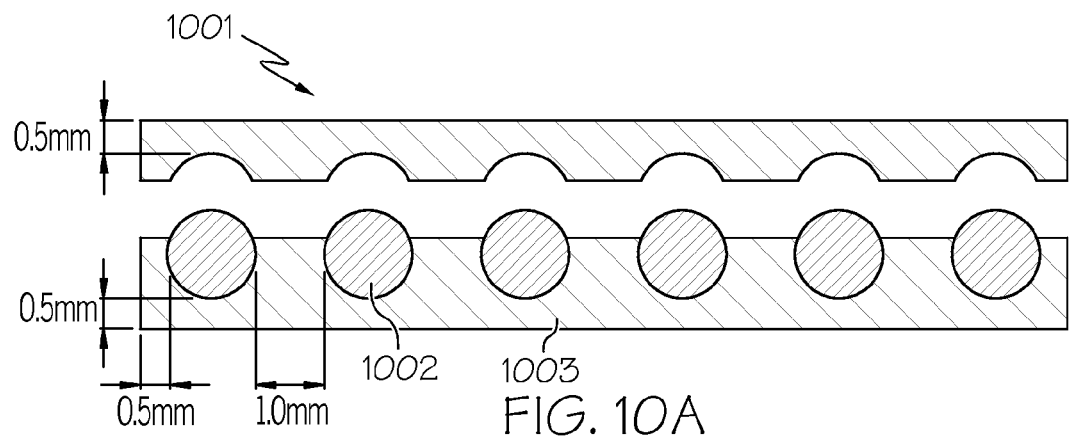
FIGS. 10, 11, and 12 illustrate various examples of optical fiber media with scintillation detector layers in modular arrangements, according to various embodiments of the invention.
Figure 10B:
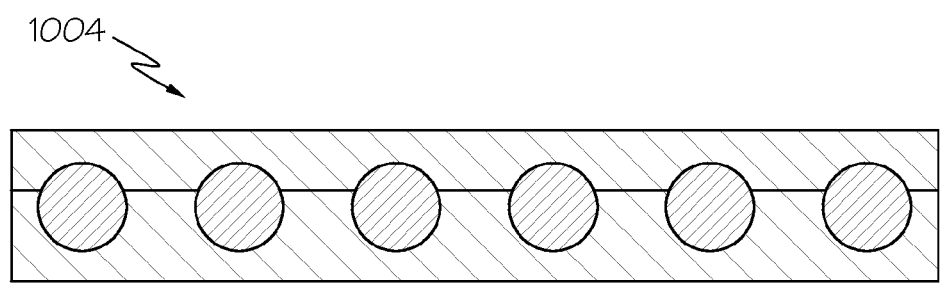
Figure 10C:
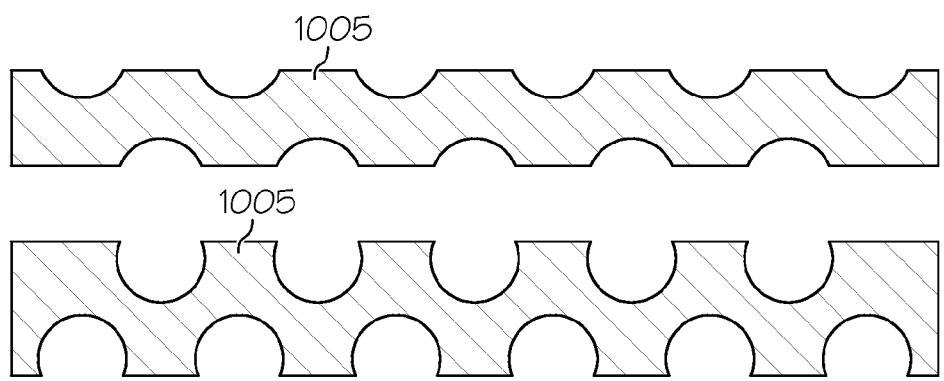

FIG. 10 illustrates optical fibers in various arrangements embedded in scintillation material utilizing a modular approach for fabrication of one or more detectors. As shown in FIG. 10, according to one embodiment, a scintillation layer is arranged as a module with a bottom piece 1003 and a top piece 1001 that are located adjacent to, and optionally abutting, each other to form one layer of a detector. Each piece 1001, 1003, has peaks and valleys formed to match peaks and valleys of the other piece 1001, 1003. Where two valleys are located adjacent to each other a space is formed to hold an optical fiber 1002 in the scintillation layer module. Each of the optical fibers 1002 is located inside the scintillation layer module to be a specific distance away from the scintillation material separating the optical fibers 1002. This distance is selected to enhance the transfer of light photons from the scintillation material into the optical fibers 1002. That is, for example, when a neutron collides with the lithium 6 (Li6) material in the scintillation layer an alpha particle or a triton particle is generated and it collides with phosphor material in the scintillation material. The collision of the alpha particle or triton particle with the phosphor material generates light photons. These light photons generated from the phosphor material normally can travel very limited distances. By locating optical fiber 1002 within this limited distance will enhance the number of photons of light that will be optically coupled into the optical fiber 1002. The scintillation module thereby provides an environment where there are many insertion points for light photons to transfer into adjacent optical fiber to enhance transfer of light photons from the scintillation material to one or more photosensors (not shown) located outside of the scintillation material. In the example shown in FIG. 10, the optical fibers 1002 are spaced approximately 1.0 millimeter apart.

Instead of drilling holes all the way through scintillation material blocks and dragging optical fibers through these holes, according to one embodiment of the present invention, one or more layers scintillation material are formed in two pieces 1001, 1003. A sheet of scintillation material of a specific thickness is created thin enough so that optical fiber will "see" (receive the light photons from) the light reaction in the scintillation material from neutron particle collisions with the scintillation material.

The optical fiber 1002 could be shaped in any type of circumference, such as a square or round circumference. In this particular example, as shown in FIG. 10, a round shape circumference was selected for the fibers 1002. The round shape of the optical fibers 1002 also facilitates coupling light photons from the scintillation material, which could be in one or more scintillation layers located above and below the optical fibers 1002. That is, multiple layers of the scintillation material with optical fibers can be located on top of each other to create a multi-layer detector. The dimensions of each layer and the optical fibers are selected to give optimum position of the optical fibers 1002 completely surrounded by the scintillating material but only of a specific thickness and distance, as shown in FIG. 10. Additionally, the optical fibers can optionally be wavelength shifting fibers 1002.

When making a detector block, or a detector having multiple detector layers, a manufacturing process uses a mold to form the paired bottom and top pieces 1001, 1003. The bottom piece 1003 at the valleys creates groves in the scintillation block where the optical fibers are located in. Then, the top piece 1001 is placed on top of the bottom piece 1003 with the optical fibers 1002 captured in the two pieces 1001, 1003. Additionally, an adhesive coated on the fibers will keep them in place so that they mate up well with the scintillation block pieces 1001, 1003. When located adjacent to, and optionally abutting, each other, the top and bottom pieces 1001, 1003, and the optical fibers 1002 sitting in the middle, form an extremely tight and seamless encasement of the optical fibers 1002. Optionally, the fibers are wave length shifting fibers 1002. These wavelength shifting fibers 1002, according to one embodiment, can be located equidistant all around with respect to the thickness of the phosphorous material. The scintillation layer block 1004 is shown totally assembled with the bottom 1003 and top 1001 pieces encasing the wavelength shifting fibers 1002. The length of this block 1004 can be selected for particular applications. Also, although the scintillation layer block 1004 is shown in a straight length of rectangular shape, it should be noted that other curved lengths and other cross-sectional shapes are anticipated by various embodiments of the present invention. For example, a curved length of the scintillation layer block 1004 could be used to detect neutron collisions in particular applications.

An alternative arrangement is also shown that staggers optical fibers within layers of scintillation material. One layer of scintillation material, with top and bottom pieces 1005, is shown that can capture optical fibers (not shown) in the valleys between the pieces 1005. However, to make a multi-layer scintillation material block, according to one embodiment, wavelength shifting fibers can be staggered from layer to layer. That is, when top and bottom pieces 1005 of one layer are adjacent to each other with optical fibers captured in the grooves between the two pieces 1005, a second layer can then be stacked on top such that the distance is reduced between fibers in adjacent layers, thereby enhancing the transfer of light photons from the scintillation material in one layer to fibers in adjacent layers. After a desired number of layers are stacked using the pieces 1005, the final top and bottom pieces 1001, 1003, could be used to complete the multi-layer scintillation block—with flat surface on the top and on the bottom of the resulting multi-layer block.

The arrangement of fiber on a top layer, for example, may actually pick up a light photon generated from a neutron collision with the scintillation material that might normally be part of a lower layer. Fibers on adjacent layers are all equal distance for the specific distance for the light photons to travel and be optically coupled to the adjacent fibers in the adjacent layers. This enhances the likelihood of picking up the light in a multi-layered detector versus stacking multiple layers of the single layer block 1004. This modular single-layer or multi-layer detector optionally could have moderator material placed above and/or below or in between the layers, according to various embodiments of the present invention. For example, a certain application could stack two scintillation detector layers and then stack these on top of a moderator layer. As a second example, a scintillation detector layer could be located on top of a moderator layer that is located on top of another scintillation detector layer, in a sandwich design. This modular approach to making scintillation detectors, or scintillation detector layers, is very flexible and particularly adaptable in mass manufacturing process.

Figure 12A:
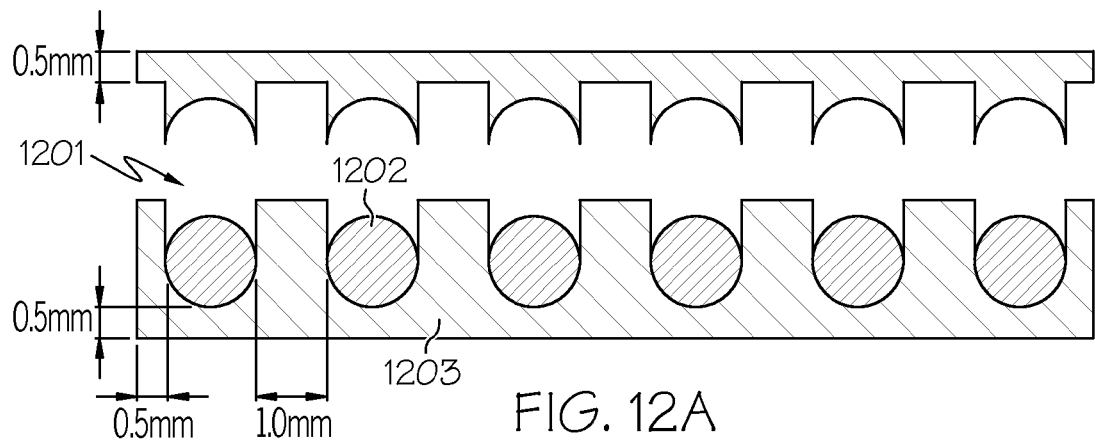
Figure 12B:
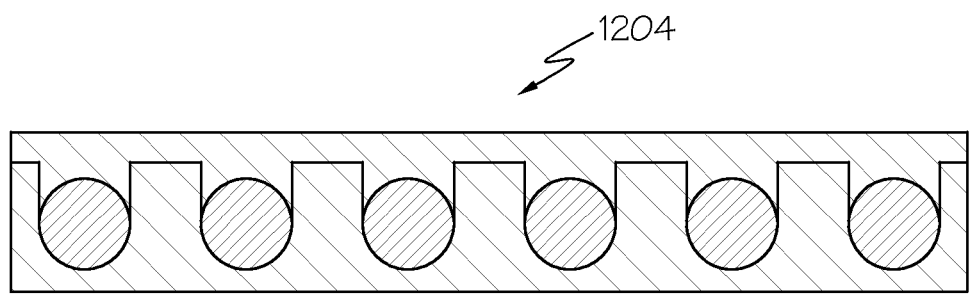
Figure 12C:
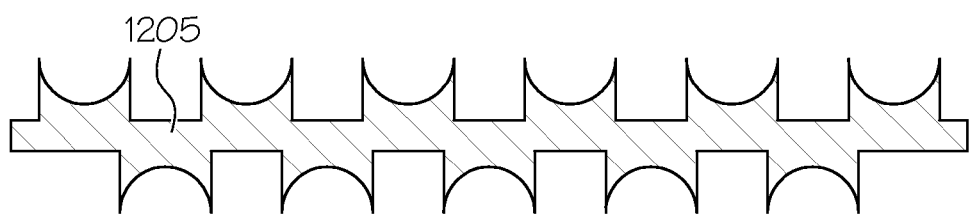

FIG. 12 illustrates an example of interlocking scintillation layers 1201, 1203, to secure the fiber optic media 1202 into the slots across the one or more scintillation layers. The interlocking scintillation layer 1201 fits into the scintillation layer 1203 holding the optical fibers 1202 and holds the optical fibers 1202 firmly into position as illustrated in the mated set 1204. The optical fibers 1202 can be placed in an offset position between each layer as illustrated in item 1205. Item 1205 also shows how one interlocking layer 1205 can be applied to two scintillation layers with fibers applied.

Figure 11:
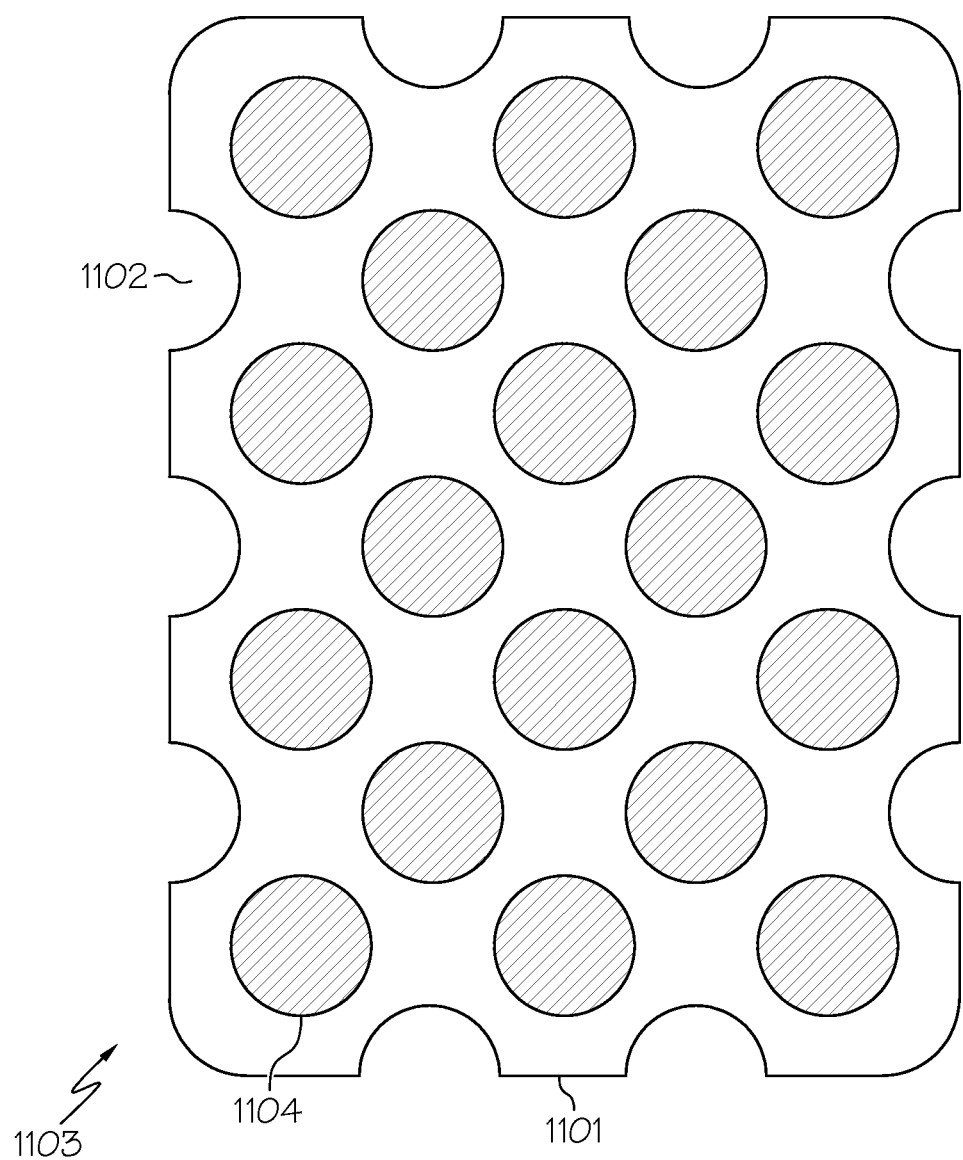

FIG. 11 is a cross section 1103 of scintillation material 1101 showing an example of efficient use of the scintillation material 1101 where areas 1102 of the scintillation material 1101 that are more than 0.5 mm distance from the optic fiber 1104 are eliminated. By removal of those areas 1102 that are not within a specified zone for the phosphor in the scintillation material 1101 to transmit light to the fiber optic media 1104, it saves costs for active scintillation materials that would not produce the desired interaction with the fiber media.

One embodiment of the fabrication process, according to the present invention, is listed below.

a. Individual wavelength shifting fiber optics can be cut to a defined length. The length being the length of the detector area and the additional lengths necessary to taper the fiber bundle to for the connection for the photo sensor.

As an option, the fiber optic cable assembly can be pre-fabricated and connected to the photo sensor in preparation for integration into the scintillation material.

b. The number of fiber optic strands are defined by the width of the detector area to be formed and the concentration of fiber optic strands to be equally spread across the width of the detector area.

c. The defined detector area is comprised of granular LiF (95% 6Li) mixed with crystals of ZnS(Ag) in a binder. Optionally a clear binder.

d. The detector materials is formed into a detector area of a specific width and length, matching the design criteria for the fiber optics. The detection/scintillation screens are comprised of granular LiF mixed with crystals of ZnS(Ag) in a binder.

e. The fiber optic media is inserted into each active scintillation layer optic fiber slot with an interlocking layer securing the fiber optics in place and providing optic coupling of the scintillation material completely surrounding the fiber or using a locking optical fiber slot and top cover, as depicted in FIGS. 10 and 12.

f. The active scintillation layers may be stacked on top of each other to make a multi-layer detector.

g. An end cap of active scintillation layer may be applied to ensure that there is appropriate thickness of active scintillation layer for the fiber optic media.

h. The opposite ends of the fibers are cut, polished, and optically coupled to one or more photo sensors. The photo sensor may be applied on each end or only one end.

i. A protective covering is applied to the detector to eliminate light intrusion into the detector area.

The neutron detector may have a read/write device associated with the detector to inform the sensor interface unit or associated analog port, which type of neutron device is being connected to enable auto configuration of the interface to the type of detector.

Thermal neutron sensitive scintillator material, useful in the fabrication of a neutron detector, includes 6Li ZnS(Ag) or other materials that release high energy He or H particles in neutron capture reactions.

Examples of such scintillator plastics include BC 704, BC 480, BC 482, and BC 484, all available from St. Gobain. The 6Li is excited by an incident neutron and reacts by emitting an alpha particle and triton into the neighboring phosphor material. The phosphor is energized by this interaction and releases the energy as photons. The photons travel into the fibers and are guided to the ends an exit into the photo sensor.

The neutron detector device is covered with a protective layer that does not allow light into the detector. The protective layer can be applied as an opaque covering to the overall assembly, an opaque shrink wrap, an opaque two part cover with a seal between the mating layers or an opaque liquid that dries onto the detector area. The area where the detector mates to the photo sensor could also be covered as part of any of these methods.

The use of the present invention provides significant improvements in form and function over a helium-3 neutron detector, as follows:

The ability to shape the neutron detector into a desired form;

The uniform efficiency across the detector area; and

The ability to apply multiple layers of the detector to create an efficiency that is close to 100%.

One potential drawback for the neutron detector described herein is the fact that it can be a poor gamma detector. However, this is a very desirable feature for a neutron detector that has near zero gamma cross-talk.

Neutron Detector with Progressive Moderators

Figure 13:
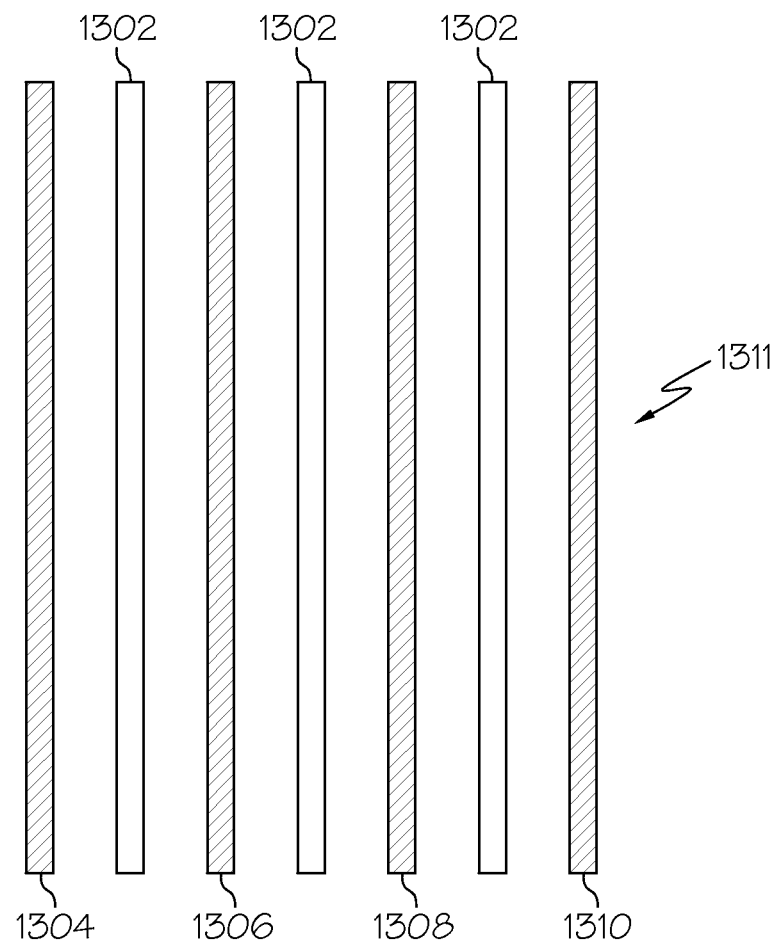
FIG. 13 is a block diagram illustrating an example of progressive moderators in a neutron detector.

In FIG. 13, an example of a neutron detector with progressive moderators is shown. The moderator materials 1302 are layered between thermal neutron detector elements 1304, 1306, 1308, 1310, to create progressively moderated neutrons 1311 traveling into the neutron detector and that can be detected by one or more of the neutron detector elements 1306, 1308, 1310. The first detector element 1304 has no moderator material in front of it to enable detection of thermal neutrons 1311 without further thermalization.

Neutron Detectors with Various Arrangements of Photo-sensor Connections

In FIGS. 14, 15, 16, and 17 fibers are respectively distributed through scintillation material to multiple photosensors. The various example arrangements of fibers coupled with photosensors enable gamma and neutron detectors to effectively handle a higher number of gamma and neutron events through a division of these events across multiple photosensors and different supporting sensor electronics connected to each of the photosensors. The fibers can be segregated such as a left side group and a right side group or can be integrated across a detector.

Figure 14:
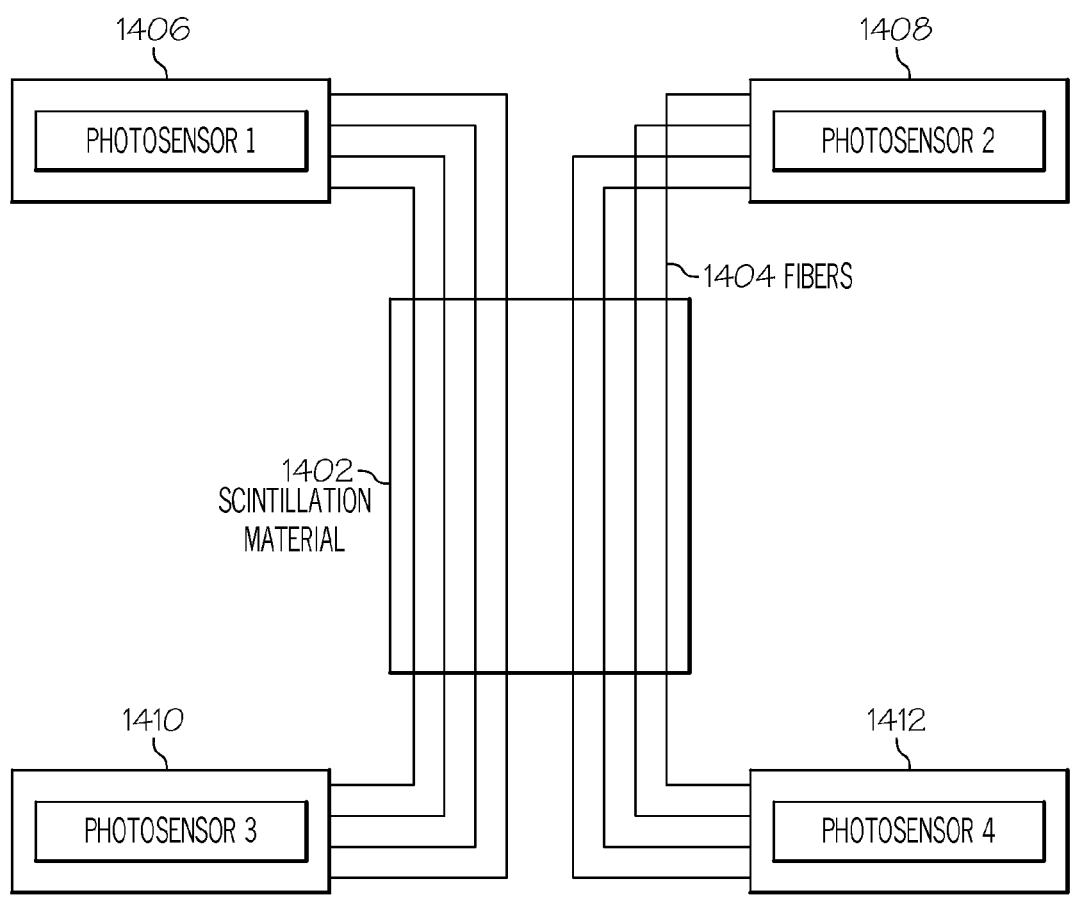
FIGS. 14, 15, 16, and 17 are blocks diagram illustrating various examples of a neutron detector with photosensor connections according to various embodiments of the present invention.
Figure 16:
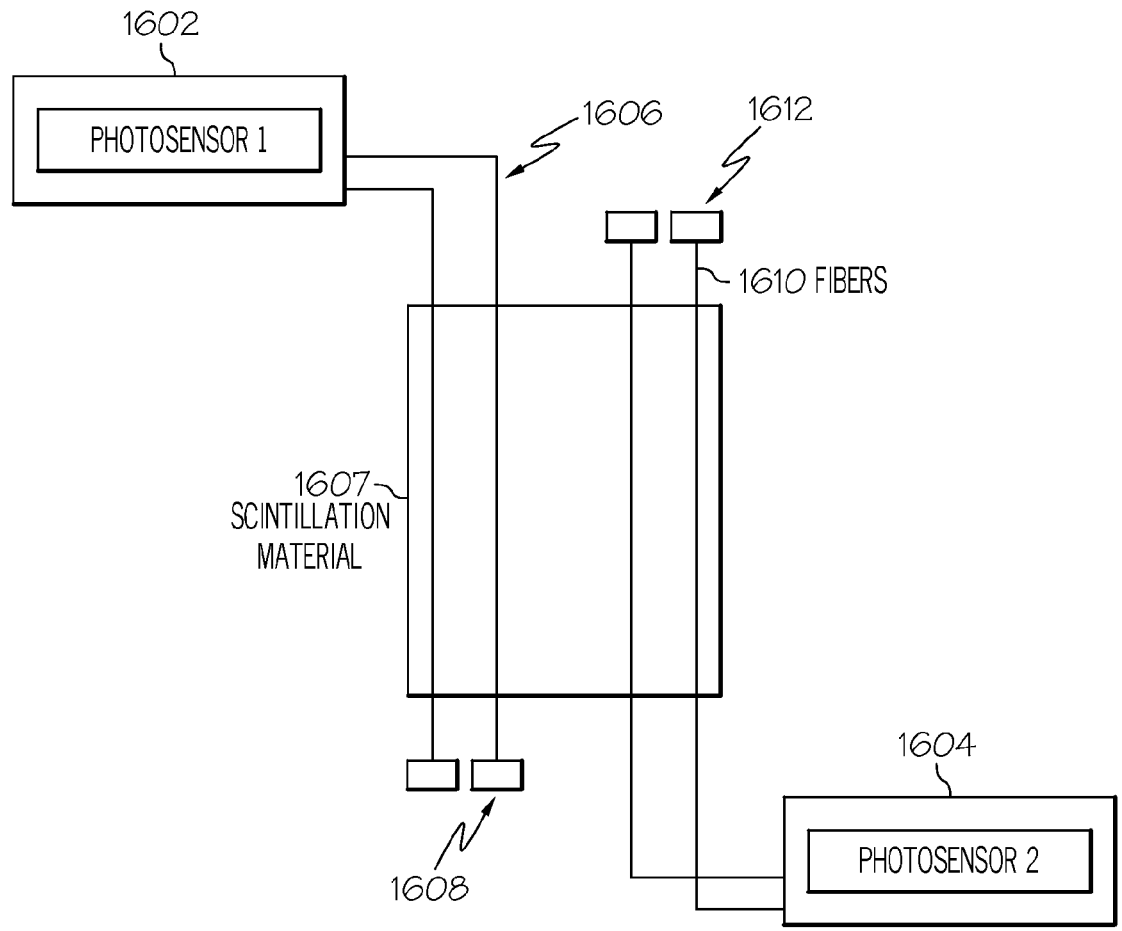

In FIGS. 14 and 16 the fibers are segmented to form a left side and right side detector group within an overall detector.

In FIG. 14, the fibers 1404 are interleaved and connected through scintillation material 1402 to multiple photosensors 1406, 1408, 1410, and 1412, arranged in two groups.

In FIG. 16, the fibers 1606, 1619, are connected to a respective photosensor 1602, 1604, on one side only and terminated 1608, 1612, on the other side of the detector. The fibers 1606, 1619 may be terminated 1608, 1612 using any of non-reflective material, light absorbing material, or reflective material, at the terminator 1608, 1612. By using terminators 1608, 1612, the cost of implementing a gamma and neutron detector can be reduced thereby enhancing the commercial viability of a detector system.

Figure 15:
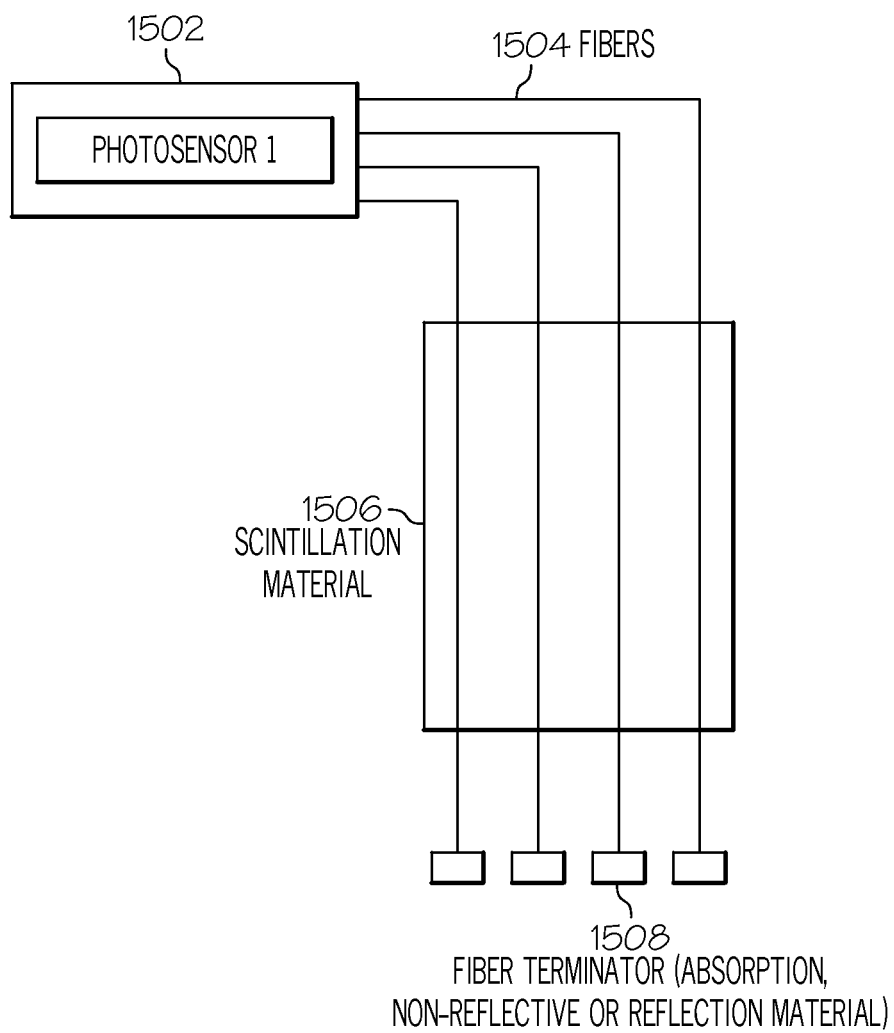

In FIG. 15, the fibers 1504 are connected to a photosensor 1502 on one side only and the fibers are connected through scintillation material 1506 to terminators 1508 thereby being terminated on the other side of the detector. The fibers 1508 may be terminated using any of non-reflective material, light absorbing material, or reflective material, at the terminator 1508. By connecting the fibers 1506 on one side to one photosensor 1502 and on the other side to terminators 1508, the cost of implementing a gamma and neutron detector can be even further reduced over the example shown in FIG. 16, thereby further enhancing the commercial viability of a detector system.

Figure 17:
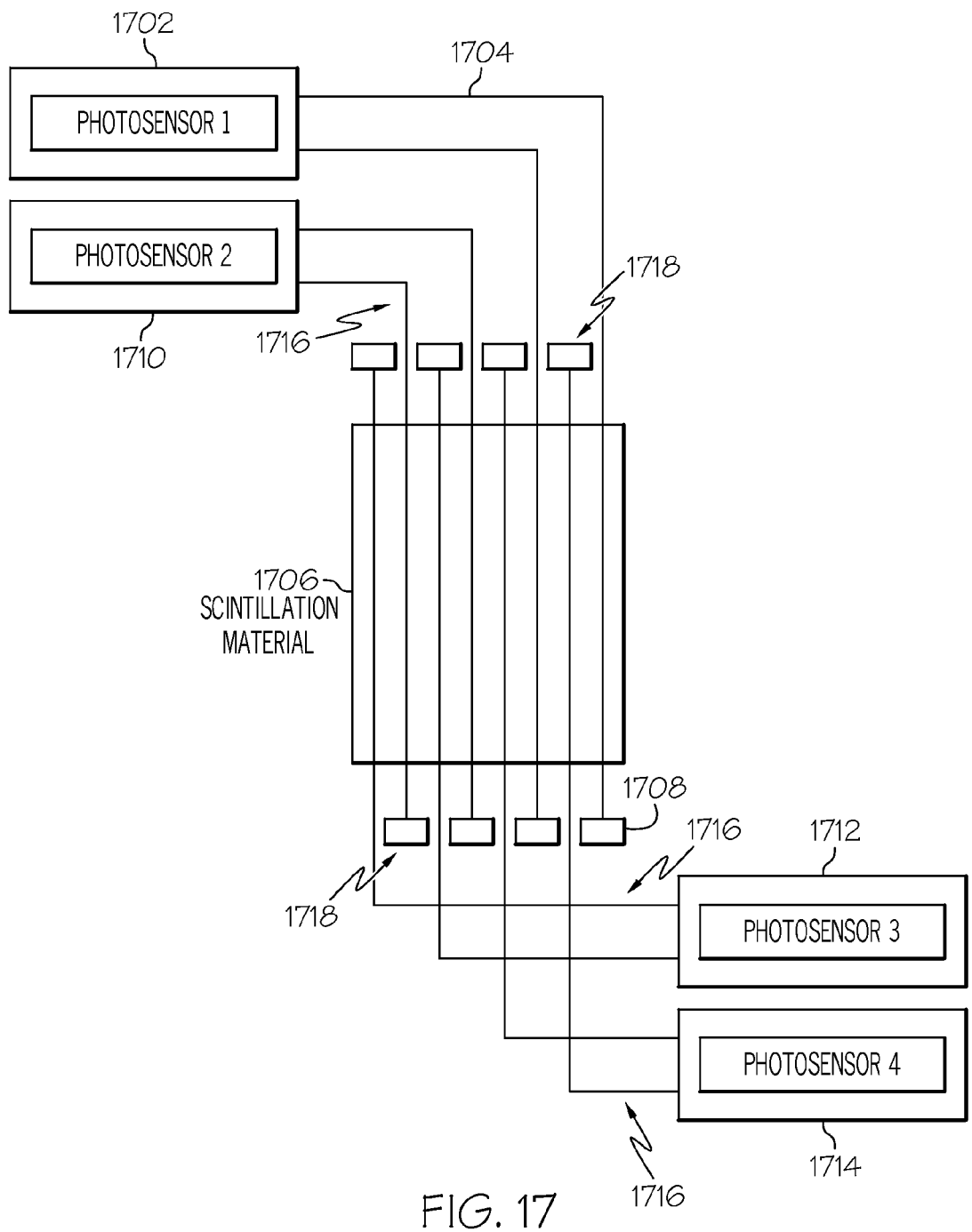

In FIG. 17, the fibers 1704, 1716, are shown interleaved and connected through scintillation material 1706 on one side to respective photosensors 1702, 1710, 1712, 1714, and on the other side of the fibers 1704, 1716, connected to respective terminators 1708, 1718. The fibers 1704, 1716 may be terminated using any of non-reflective material, light absorbing material, or reflective material, at the respective terminators 1708, 1718. This arrangement integrates the fibers 1704, 1716, though the scintillation material 1706 and individually connects each fiber 1704, 1716, to only one respective photosensor 1702, 1710, 1712, 1714. As can be seen by the various examples shown in the FIGS. 14 to 17, many different arrangements of fibers connected with photosensors, optionally including terminators on one side of one or more of the fibers, are anticipated by various embodiments of the present invention.

Homogeneous Distribution of Encapsulated Particles

Various embodiments of the present invention will benefit from a technique of fabricating a high performance neutron detector with high reliability and homogenous distribution of particles encapsulated in a binder such as a polymer to produce a high performance neutron detector.

Conventional processing methods that involve distribution of particles mixed into a polymer are based on a thermal cure to activate the cross linking process and promote the liquid to solid phase transition of polymer and thereby encapsulating the particles in the polymer. A non-thermal curing method based on UV irradiation can be used to rapidly cure specially tailored chemistries. However, these chemistries contain high levels of ionic impurities.

Thermal curing methods are based on convection heating which utilizes the flow of hot air. The hot air molecules in the oven collide with detector materials. Heat absorption results in an increase in the average interatomic distances and, in general, an overall increase in the physical dimensions of the materials on the macroscopic level.

The ramifications of these long cure cycles are slow production throughputs coupled with settlement and migration of the particles resulting in a non-homogenous product.

The long cure cycles of adhesive materials are needed to promote the required materials' properties. The fundamental chemistry of curing the polymer has remained relatively unchanged over the years. However, improvements in catalysts and hardeners have the potential to alter and improve the cure times.

There is a great need for neutron detectors in a wide variety of sizes. There is also a need for a reliable and efficient production method to produce these neutron detectors in volume.

Figure 18:
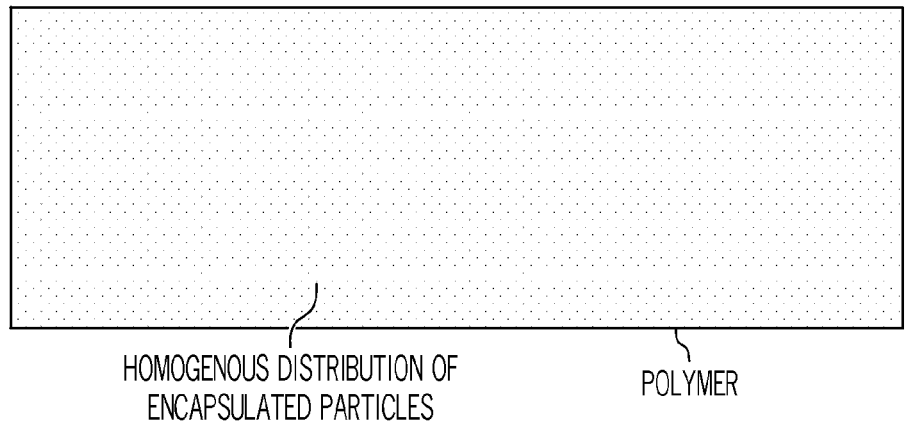
FIG. 18 is a block diagram illustrating a homogenous distribution of particles within a polymer for use in a neutron detector according to one embodiment of the present invention.

With reference to FIG. 18, a rapid curing process for polymers, using microwave curing, will be described. Microwave curing can be applied to fabricating a high performance neutron detector with high reliability of homogenous distribution of the particles encapsulated in a polymer to produce a high performance neutron detector. Examples of microwave curing include Variable Frequency Microwave (VFM) technique or High-Frequency Microwave Beams (HFMB).

According to one embodiment of the invention, a microwave curing process is used to fabricate thermal neutron detectors that comprise, for example, one or more layers of 6LiF mixed in a binder medium with a scintillator material ZnS(Ag) to create a thermal neutron detection material that is optically coupled to one or more fiber optic light guide media. These optical fibers have a tapered portion extending from one or both ends of said layers to guide the light to a narrowed section. The narrow section is connected to a photo-sensor. A photo sensor is connected to a pre-amp designed to drive the detector signal processing rate close to the decay time of the scintillator material. This enables pulses to be delivered without distortion to a set of electronics that perform analog to digital conversion. Firmware or software processes the signals to apply digital gamma pulse differentiation for elimination or separation of gamma signal interference. One or more neutron detector layer(s) may be interleaved with one or more layers of moderator material to increase interaction with thermal neutrons.

The inventor has determined that Microwave techniques such as the Variable Frequency Microwave (VFM) and High Frequency Microwave Beam will provide for more rapid curing when compared to the convection cure. It is estimated that the curing time can be reduced by a factor of between 5 and 50. Furthermore, the VFM process results in a lower stress cure with equivalent mechanical properties of the polymer encapsulants.

Li6 and ZnSA(Ag) particles can be mixed (encapsulated) in a binder (polymer). In the case of curing the polymer encapsulant of the Li6 and ZnS(Ag) particles that are mixed in the polymer, conventional thermal curing process times can be longer than 10 minutes. The ramifications of these long cure cycles are slow production throughputs coupled with settlement and migration of the Li6 and ZnS(Ag) particles resulting in a non-homogenous product.

The inventor has determined that there is a great need for Li6ZnS(Ag) neutron detectors in a wide variety of sizes that require homogenous distribution of the Li6 and ZnS(Ag) particles within the polymer for optimum performance. There is also a need for a reliable and efficient production method to produce these neutron detectors in volume.

A process by which polymers with encapsulated particles, such as Li6 and ZnS(Ag) can be cured resulting in homogenous distribution of the encapsulated particles and create the desired properties for a neutron detector material within rapid process window is provided through the use of Variable Frequency Microwave (VFM) energy. In addition to the rapid curing times, the VFM-based process provides a means by which some control can be provided over the stress level of the cured polymers. VFM processing offers a unique capability in providing uniform and rapid heating over a large volume at high energy efficiency. Also, this revolutionary process should provide an ability to meet productivity challenges from the neutron detector industry.

The variable frequency microwave technique, which utilizes swept frequencies, is unique from conventional microwave processing, which uses a fixed microwave frequency.

Through this sweeping process, the problems that have been observed in conventional microwave ovens with non-uniformities in temperature and arcing are avoided. The VFM technique utilizes three major parameters in order to provide processing reliability. These parameters are central frequency, frequency bandwidth, and sweep rate. Via a user-friendly computer routine, these parameters are processed such that the bandwidth is divided into 4096 points. During a polymer cure, the computer cycles through these 4096 frequencies consecutively, with each cycle corresponding to the sweep rate input (typically 0.1 sec.). For each frequency launched into a cavity, there are standing wave patterns, consisting of tens of modes inside the cavity. By cycling through the frequencies, the VFM in effect launches 4096 different frequencies into the cavity with each sweep cycle (e.g., 0.1 sec). This large number of frequencies excited during processing results in a uniform energy distribution throughout the oven.

The VFM process avoids particle settling and provides a uniform distribution of fillers throughout the polymer. There is also no sedimentation making the particle distribution homogeneous within the polymer.

The neutron detector fabricated according to the novel curing process described above will have the desired properties of uniform homogeneous particle distribution which provides high levels of efficiency with near zero gamma cross talk. This is important to a wide variety of applications: such as portal detectors, e.g., devices in which a person or object is passed through for neutron and gamma detection, fissile material location devices, neutron based imaging systems, hand held, mobile and fixed deployments for neutron detectors.

A thermal neutron sensitive scintillator useful in the fabrication of a neutron detector include 6Li—ZnS, 10BN, and other thin layers of materials that release high energy He or H particles in neutron capture reactions. Such materials can be 6Li- or 10B-enriched ZnS, 10BN, or other phosphors that contain Li or B as an additive.

Examples of such scintillator plastics include BC 480, BC 482, and BC 484, all available from the company St. Gobain, SA. The 6Li is excited by an incident neutron and reacts by emitting an alpha particle and triton particle into the neighboring phosphor material. The phosphor is energized by this interaction and releases the energy as photons. The photons travel, and typically are guided by optical fibers, into the photo sensor.

An example moderator used is dense polyethylene. A variety of moderator and detector configurations can be designed. One or more moderator layers can be interleaved with one or more detector layers for optimum performance.

The detector and moderator layers can be formed as individual modules for convenience of fabrication. The detector and moderator layers can be combined and packaged within a light shield to form a neutron detector unit.

Examples of Various Neutron Detector Configurations

Figure 19:
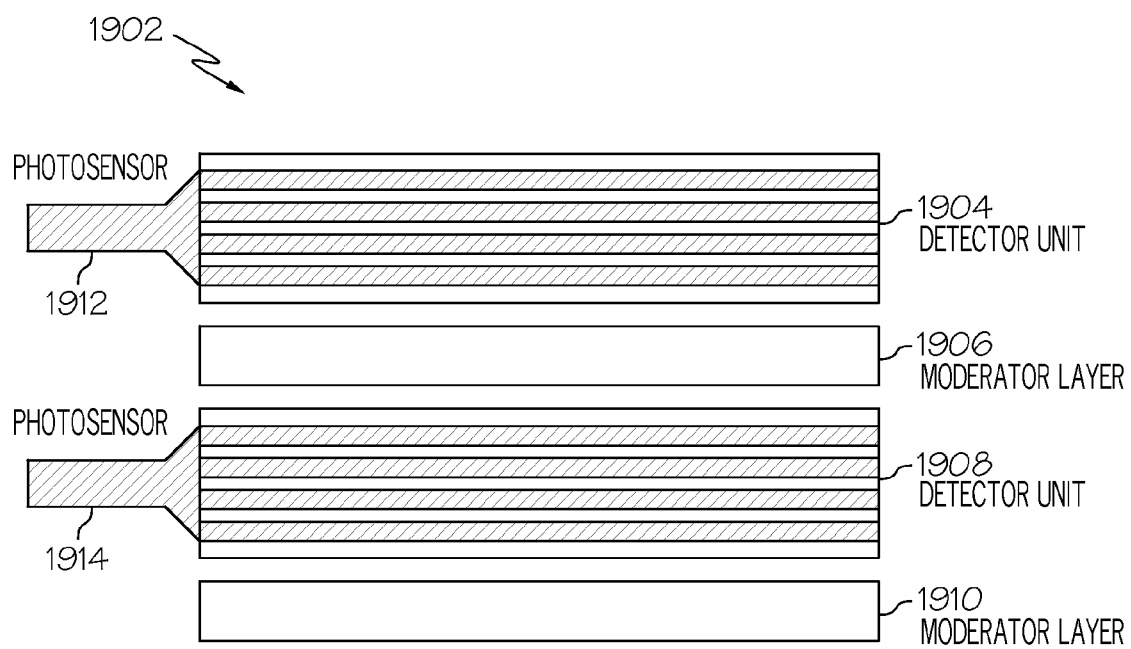
FIG. 19 shows one example of two detectors sandwiched together with a moderator material layer separating the individual detectors, and each detector being optically coupled to a photo sensor; according to one embodiment of the present invention.

FIG. 19 illustrates a multiple detector configuration with two photo-sensors. A four layer detector, in this example four detector layers with interposed moderator layers is on top of a thicker moderator layer that spatially separates the top detector from a similar bottom detector having four detector layers with interposed moderator layers. Each four layer detector is optically coupled with a separate photo-sensor. Additionally, a light shield material is located on top of the top detector and a light shield material is located underneath the bottom detector. The light shield material surrounding the multiple detector structure, as shown in FIG. 19, enhances the detection of light from the scintillation material in the detector layers without interference from external light.

Figure 21:
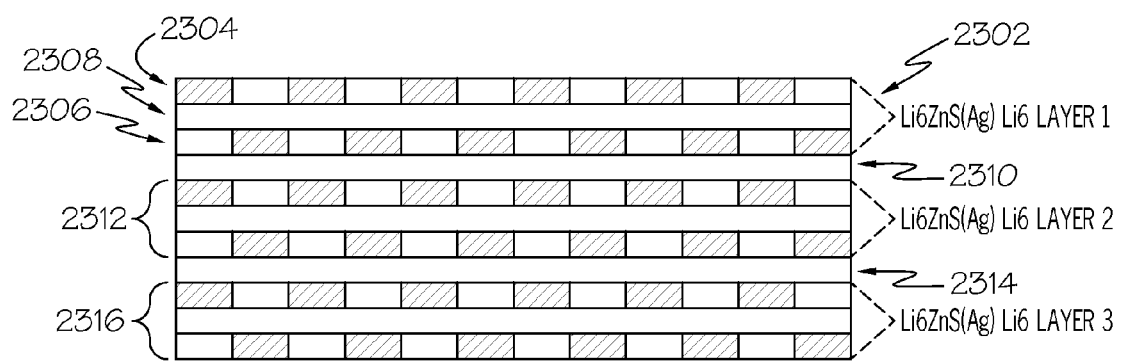
FIG. 21 is a block diagram illustrating neutron detector layers with neutron detector elements interposed with moderator material in a spatial distribution arrangement, and the neutron detector layers being interposed with moderator layers, according to one embodiment of the present invention.

FIG. 21 shows an example of combining layers of detectors with spatial distribution techniques to significantly increase the efficiency of detection of neutron particles by at least one detector. As shown in FIG. 21, each detector layer 2302 is spatially distributed by separating the layer of detector material 2302 into two layers 2304, 2306, with moderator material interposed horizontally between detector elements. A layer of moderator material 2308 is also interposed between the two detector layers 2304, 2306.

FIG. 21 also shows three of these detectors 2302, 2312, and 2316, with moderator material 2310, 2314, interposed between layers of detectors 2312, 2316. Neutron efficiency is increased. Neutrons that travel into the overall structure shown in FIG. 21 may enter one of the detector layers 2302 and the neutron particle are either detected by a detector element in that layer 2302 or pass through the detector element. When the neutron particle passes through a first detector element the neutron particle may collide with adjacent moderator material and be further thermalized. Then, the thermalized neutron particle may be detected by another detector element in that layer 2302 or by a detector element in a next detector layer 2312, 2316. Also, a neutron particle may bounce around in the adjacent moderator and may be sent back into the first detector element to be detected. By further thermalizing an incident neutron a thermal neutron will likely be detected by one of the detector elements in a detector layer 2302, 2312, 2316. Also, traveling neutrons are caused to ricochet all over the detector structure shown in FIG. 21, and possibly a thermalized neutron will re-enter the detector they just went through and go back through it again. This gives a higher probability of detection by making the thermalized neutrons pass through the detector layers 2302, 2312, 2316, multiple times after ricocheting in adjacent moderator material.

This detector structure shown in FIG. 21 significantly increases neutron detection efficiency while not increasing gamma interference (cross-talk) because this overall structure separates detector material into detector elements with adjacent moderator material without adding more detector material than would be used in a single detector layer. The total amount of detector material used in a detector has a direct relationship with the amount of gamma particle interaction that could cause gamma interference while attempting to detect neutron particles. Also, this detector structure shown in FIG. 21 causes the neutrons to go back through the detector material multiple times and re-use the neutron particle to capture more light detection. This increases neutron detection efficiency while not increasing gamma detection efficiency because the configuration does not add more detector material. It is the scintillation material that may be scintillated by either neutron particle impacts or by gamma particle impacts in the scintillation material. Further, this spatial distribution of detector elements with moderator material may lower gamma detection, which is highly desirable, because a traveling gamma particle may be absorbed into the moderator material. Additionally, various embodiment of the present invention utilize a novel gamma filtering system, including fast digital electronics and digital processing techniques, to filter out all gamma cross-talk from neutron detection. This overcomes the problems with the prior art of using analog electronics and slow analog signal processing techniques that are not effective to filter out gamma signal interference. A detector according to one embodiment of the present invention can clearly see the different signals from neutron collisions and from gamma collisions in the detector. It uses fast electronics and digital signal processing environment to do reliable digital pulse shape analysis. The novel detector device arrangements in combination with novel electronic circuits and digital signal processing, as have been discussed above, makes a neutron detector reliable and usable in many applications because now the neutron detector can filter out all gamma cross-talk.

It should be noted that the added moderator layer, as shown in FIG. 21, enhances spatial distribution generally in the vertical direction with all detector elements being separated by moderator material. In FIG. 21 all detector elements are separated by moderator material.

Alternative Embodiment of Detector Using Solid-State Photomultiplier

Figure 20:
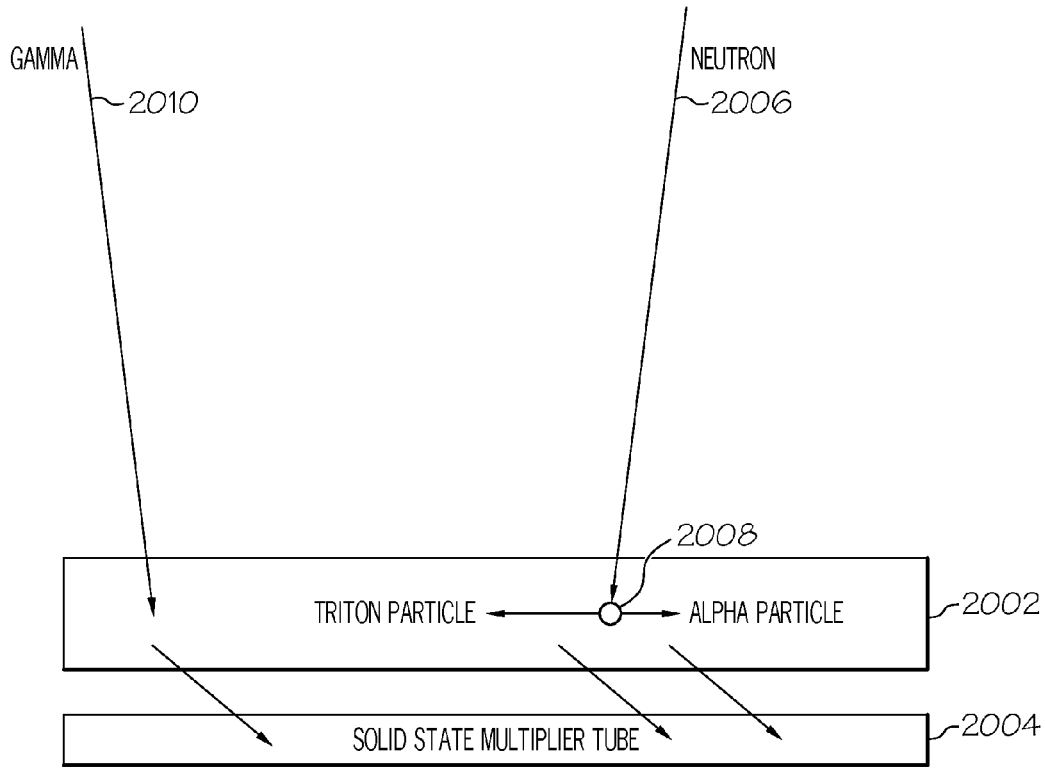
FIG. 20 is a block diagram showing a gamma and neutron detector optically coupled with a solid-state photomultiplier, according to an alternative embodiment of the present invention.

FIG. 20 shows an alternative embodiment using solid state photomultipliers as photosensors. A solid state photo-multiplier (SSPM) 2004, which may also be referred to as a solid state photo-multiplier tube (SSPMT), comprises an array of photo detecting elements that are arranged in a layer. The solid-state photomultiplier is a relatively new semiconductor based photodetector that possesses high gain and low noise while needing only low voltage to operate. The fast response and high gain of SSPMs makes them attractive for detector system applications according to various embodiments of the present invention.

The layer of photo detecting elements is located adjacent to, and optionally abutting, the scintillation material 2002. The array of photo detecting elements directly detect the light photons emitted from the scintillation material 2002 without using wave guide fibers in the detector (scintillation material) 2002 to pick up and deliver light photons to the photosensor. This simplifies a detector manufacturing process and reduces the overall manufacturing cost of the detector system. The speed and linearity of an SSPM, when coupled with a scintillator, provides a useful alternative to the previously discussed photosensors, such as photo-multiplier tubes, phototransistors, and photodiodes. A pixilated array of photo detecting elements are distributed across the entire face of the detector (scintillation material) and replace the wave length shifting fibers used in various embodiments discussed above. By dispensing with the use of fibers it removes material and processing costs in a manufacturing process, such as described, for example, with reference to FIGS. 9 to 12. A square block of scintillation material, for example, can be placed adjacent to the pixilated array layer of the SSPM.

According to this alternative embodiment, a neutron particle 2006 travels into the scintillation material 2002 and collides 2008 with the scintillation material (e.g., with the lithium). This neutron collision 2008 in the scintillation material 2002 causes a triton particle or alpha particle to be generated which then activates nearby phosphor material in the scintillation material 2002. This activation of the phosphor generates light photons that are transmitted out of the scintillation material 2002 and into the SSPM 2004. The SSPM detects the light photons and generates an electronic signal that corresponds to the detected light photons. This electronic signal is amplified and delivered as an output electrical signal from the SSPM. It should be noted that gamma particles 2010 may also be detected by the scintillation material 2002 and thereby generate light photons into the SSPM 2004. The fast electronic circuits and digital processing, according to one embodiment of the present invention, can accurately distinguish detected gamma pulses from detected neutron pulses.

The scintillation material 2002 preferably comprises clear binder material that is light transmissive to allow the light photons to transfer out of the scintillation material 2002 with little to no attenuation. This clear binder approach may be used in any of the various embodiments of the present invention as have been discussed above to enhance the detection process.

In summary, by implementing a detector using a solid-state photomultiplier optically coupled with the scintillation material of the detector, the photosensor (in this case a SSPM) directly detects the light photons emitted from the scintillation material without need for optical light guide fibers to be included with the detector. This configuration of a detector using a solid state photomultiplier reduces overall manufacturing costs, simplifies a manufacturing process, and is more compatible with a mass manufacturing operation, which enhances the commercial viability of this type of detector.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of fabrication a neutron detector comprising one or more scintillation detector layers in a modular configuration, the method comprising:
   a. mixing 6LiF with a binder medium with a scintillator material to form a plurality of active scintillation layers;
   b. interleaving layers of fiber optics and the plurality of active scintillation layers stacked on top of each other to make at least one multi-layer detector, the fiber optics comprising optical light media having at least one end;
   c. separating at least two of the plurality of multi-layer detectors with moderator material;
   d. coupling the at least one end of the optical light media to at least one photo sensor; and
   e. coupling the at least one photo sensor to a pre-amp which is further coupled to a digital signal processor.

2. The method of claim 1, further comprising:
   a. tapering at least one end of a fiber optical light media that extends out of the stacked active scintillation layers to guide light to a narrowed section of the fiber optical light media; and
   b. positioning the tapered at least one end having the narrowed section adjacent to an optical input of a photosensor.

3. The method of claim 1, wherein the optical light media comprises a wavelength shifting fiber or plate.

4. The method of claim 1, further comprising:
   electrically coupling an output of a photo sensor to an electrical input of a pre-amp circuit designed to operate, without adding distortion on electrical signals from the output of the photo sensor, as fast as the decay time of light pulses from the scintillator material of at least one of the plurality of active scintillation layers, when the scintillator material interacts with thermal neutron particles.

5. The method of claim 4, further comprising:
electrically coupling an output of the photo sensor to a set of electronics and a digital processing system that are configured to perform:
analog to digital conversion of a sensor signal from the photo sensor; and
digital processing of a digitized representation of the sensor signal for gamma pulse differentiation for elimination or separation of gamma signal interference from neutron pulse detection.

6. The method of claim 1, wherein the scintillator material mixed in the binder comprises ZnS(Ag).

7. The method of claim 1, wherein the binder is a clear binder that allows transmission of light pulses from the scintillator material to one or more fiber optical light media in the at least one multi-layer detector.

8. The method of claim 1, wherein the scintillator material is combined with a binder that is not selected based on a significant hydrogenous content.

9. The method of claim 1, wherein the scintillator material is combined with a binder that is selected based on a significant hydrogenous content.

10. The method of claim 1, wherein the optical light media comprises a plurality of wavelength shifting fibers extending out of the stacked active scintillation layers.

11. The method of claim 10, wherein each of the plurality of wavelength shifting fibers is formed with a tapered end extending out of the stacked active scintillation layers and formed to optically couple to an optical input of a photo sensor.

12. The method of claim 10, wherein one or more of the plurality of wavelength shifting fibers are preformed with tapered ends designed for easy coupling into one or more photo sensors.

13. The method of claim 1, wherein an end portion of the at least one end of the optical light media is inserted into an optical retainer ring which is connected to a housing holding both the optical retainer ring and a photo sensor.

14. The method of claim 1, wherein the one or more active scintillation layers comprise granular 6LiF ($\geq$95% 6Li) mixed with crystals of ZnS(Ag) in a binder.

15. The method of claim 1, wherein the one or more active scintillation layers comprise granular 6LiF ($\geq$95% 6Li) mixed with crystals of ZnS(Ag) in a hydrogenous binder.

16. The method of claim 1, further comprising:
applying a light shield to an outer shell of the plurality of active scintillation layers stacked on top of each other, acting as an opaque cover to eliminate outside light interference.

17. The method of claim 1, further comprising any one or more of the following:
a. wherein the optical light media comprising wavelength shifting optical fiber of a specific length provided with fiber media for application onto an active scintillation layer, the length being the length of a detector area and the additional length necessary to taper a fiber bundle to a connection with a photo sensor;
b. wherein the optical light media comprising a number of fiber optic strands being defined by the width of a detector area to be formed and the concentration of fiber optic strands to be equally spread across the width of the detector area;
c. wherein at least one of the active scintillation layers comprising scintillator material at a defined detector area comprised of granular 6LiF ($\geq$95% 6Li) mixed with crystals of ZnS(Ag) in a binder;
d. wherein the at least two of the plurality of multi-layer detectors comprising detector material formed into a detector area of a specific width and length, matching a design criteria for the fiber optics, the scintillator material comprising granular LiF mixed with crystals of ZnS (Ag) in a binder;
e. wherein the optical light media comprising fiber optic media optically attached to both sides of an active scintillation material;
f. wherein the at least two of the plurality of multi-layer detectors comprising interleaved layers of fiber optics and scintillation materials stacked on top of each other to make a multi-layer detector;
g. wherein the at least two of the plurality of multi-layer detectors comprising moderator material placed in-between two or more multi-layer detectors; and
h. wherein the at least two of the plurality of multi-layer detectors comprising two or more multi-layer detectors optically coupled to a photo sensor.

* * * * *